US011186990B1

(12) United States Patent
Bannos et al.

(10) Patent No.: US 11,186,990 B1
(45) Date of Patent: Nov. 30, 2021

(54) LVL STRUCTURE

(71) Applicant: Boise Cascade Company, Boise, ID (US)

(72) Inventors: Philip Bannos, Batavia, IL (US); David Bolton, Lena, LA (US)

(73) Assignee: Boise Cascade Company, Boise, ID (US)

( * ) Notice: Subject to any disclaimer, the term of this patent is extended or adjusted under 35 U.S.C. 154(b) by 0 days.

(21) Appl. No.: 16/936,686

(22) Filed: Jul. 23, 2020

(51) Int. Cl.
| E04C 3/12 | (2006.01) |
| E04C 3/16 | (2006.01) |
| B32B 21/04 | (2006.01) |
| B32B 7/12 | (2006.01) |
| B32B 21/14 | (2006.01) |
| E04B 5/12 | (2006.01) |

(52) U.S. Cl.
CPC ............... *E04C 3/122* (2013.01); *B32B 7/12* (2013.01); *B32B 21/042* (2013.01); *B32B 21/14* (2013.01); *E04C 3/16* (2013.01); *B32B 2471/00* (2013.01); *E04B 5/12* (2013.01)

(58) Field of Classification Search
CPC . E04C 3/122; E04C 3/16; B32B 21/14; E04B 5/12
See application file for complete search history.

(56) References Cited

U.S. PATENT DOCUMENTS

| 3,566,937 A | 3/1971 | Erickson | |
| 3,606,942 A | 9/1971 | Daniels | |
| 4,630,424 A * | 12/1986 | Eberle | E04C 3/16 52/691 |
| 4,641,480 A * | 2/1987 | Mort | E04C 3/16 403/230 |
| 4,872,299 A * | 10/1989 | Troutner | E04C 3/292 52/693 |
| 4,893,961 A * | 1/1990 | O'Sullivan | E04B 5/12 403/232.1 |
| 4,942,084 A * | 7/1990 | Prince | B27D 1/00 428/464 |

(Continued)

FOREIGN PATENT DOCUMENTS

JP 2014205306 10/2014

OTHER PUBLICATIONS

Cognex Vision Software, "GigE Vision Cameras User's Guide," Published 2011.

(Continued)

*Primary Examiner* — Patrick J Maestri
(74) *Attorney, Agent, or Firm* — Hawley Troxell Ennis & Hawley LLP; Philip McKay

(57) ABSTRACT

An LVL structure is a rectangular cell suitable for weight bearing uses such as floor trusses. The LVL structure includes one or more LVL beams having first surfaces that are a single outer layer of a veneer stack. Fastening plates/devices having penetrating members are used to attach the one or more LVL beams to the LVL structure with the penetrating members penetrating the single veneer layer first surface of the LVL beams substantially perpendicular to the first surfaces. In this way, the penetrating members do not split/separate the layers of veneer making up the LVL beams and tend to secure the penetrated layers of the veneer making up the one or more LVL beams together in a nail like fashion.

16 Claims, 15 Drawing Sheets

(56) References Cited

U.S. PATENT DOCUMENTS

| | | | |
|---|---|---|---|
| 4,967,534 A * | 11/1990 | Lines | E04C 3/14 |
| | | | 52/837 |
| 5,892,808 A | 4/1999 | Goulding et al. | |
| 5,960,104 A | 9/1999 | Conners et al. | |
| 6,495,833 B1 | 12/2002 | Alfano et al. | |
| 9,164,029 B2 | 10/2015 | Tsuchikawa et al. | |
| 10,260,232 B1 | 4/2019 | Conboy | |
| 10,825,164 B1 | 11/2020 | Bolton et al. | |
| 10,933,556 B2 | 3/2021 | Bolton et al. | |
| 10,933,557 B2 | 3/2021 | Bolton et al. | |
| 11,090,833 B2 | 8/2021 | Bolton et al. | |
| 2003/0042180 A1 | 3/2003 | Kairi | |
| 2004/0146615 A1 | 7/2004 | McDonald et al. | |
| 2005/0098728 A1 | 5/2005 | Alfano et al. | |
| 2005/0161118 A1 | 7/2005 | Carman et al. | |
| 2009/0279773 A1 | 11/2009 | Gan et al. | |
| 2010/0141754 A1 | 6/2010 | Hiraoka | |
| 2013/0333805 A1 | 12/2013 | Gagnon et al. | |
| 2016/0067879 A1 | 3/2016 | Capps | |
| 2017/0023489 A1 | 1/2017 | Iizuka et al. | |
| 2020/0171695 A1 | 6/2020 | Bolton | |
| 2020/0171696 A1 | 6/2020 | Bolton | |
| 2020/0171697 A1 | 6/2020 | Bolton | |
| 2020/0173914 A1 | 6/2020 | Bolton | |
| 2020/0173915 A1 | 6/2020 | Bolton | |
| 2020/0175670 A1 | 6/2020 | Bolton | |
| 2020/0234427 A1 | 7/2020 | Cui et al. | |
| 2021/0319548 A1 | 10/2021 | Bolton et al. | |
| 2021/0327049 A1 | 10/2021 | Bolton et al. | |

OTHER PUBLICATIONS

Cognex, "Vision Controller Installation Manual," 2014.
Cognex, "Vision Product Guide," 2018.
USNR Transverse High Grader information sheet, copyright 2019; retrieved May 23, 2019 from https://www.usnr.com/en/product/THGLM.
USNR Lineal High Grader information sheet, copyright 2019; retrieved May 23, 2019 from https://www.usnr.com/en/product/LHGLM.
USNR LHG E-Valuator Module, copyright 2019; retrieved May 23, 2019 from https://www.usnr.com/en/product/LHGEValuatorLM.
USNR Planer/Dry Mill Optimization information sheet, copyright 2019; retrieved May 23, 2019 from https://www.usnr.com/en/product/mktoptplanermilllm.
Mecano Advantages information sheet, copyright 2019; retrieved May 23, 2019 from http://www.raute.com/mecano-advantages.
Mecano Solutions information sheet, copyright 2019; retrieved May 23, 2019 from http://www.raute.com/mecano-solutions.
Mecano Products information sheet, copyright 2019; retrieved May 23, 2019 from http://www.raute.com/264.
Drying Lines information sheets, copyright 2019; retrieved May 23, 2019 from http://www.raute.com/mecano-drying-lines?redirect=http%3A%2F%2Fwww.raute.com%2Flvl%3Fp_p_id%3%26p_plifecycle%3D0%26p_p_state% . . . .
Layup Lines information sheet, copyright 2019; retrieved May 23, 2019 from http://www.raute.com/mecano-layup-lines.
Veneer Handling Lines information sheet, copyright 2019; retrieved May 23, 2019 from http://www.raute.com/mecano-veneer-handling-lines.
Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.
Conners et al., "Machine vision technology for the forest products industry," 1997, IEEE, Computer, vol. 30. No. 7, pp. 43-48. (Year: 1997).
Nieminen et al., "Laser transillumination imaging for determining wood defects and grain angle," 2013, Measurement Science and Technology, vol. 24, No. 125401, 7 pages. (Year 2013).
Tsuchikawa et al., "A review of recent application of near infrared spectroscopy to wood science and technology," 2015, Journal of Wood Science, vol. 61, pp. 213-220. (Year: 2015).
Colares et al., "Near infrared hyperspectral imaging and MCR-ALS applied for mapping chemical composition of the wood specie *Swietenia macrophylla* King (Mahogany) at microscopic level," 2016, Microchemical Journal, vol. 124, pp. 356-363. (Year: 2016).

\* cited by examiner

LVL STRUCTURE

RELATED APPLICATIONS

This application is related to U.S. patent application Ser. No. 16/205,027, naming David Bolton as first-named inventor, filed Nov. 29, 2018 entitled "IMAGING SYSTEM FOR ANALYSIS OF WOOD PRODUCTS," which claims the benefit of David Bolton, U.S. Provisional Patent Application No. 62/595,489, filed on Dec. 6, 2017, entitled "IMAGING SYSTEM FOR ANALYSIS OF WOOD PRODUCTS," which is hereby incorporated by reference in its entirety as if it were fully set forth herein.

This application is related to U.S. patent application Ser. No. 16/687,311, naming David Bolton as first-named inventor, filed Nov. 18, 2019, entitled "METHOD AND SYSTEM FOR DETECTING MOISTURE LEVELS IN WOOD PRODUCTS USING NEAR INFRARED IMAGING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is also related to U.S. patent application Ser. No. 16/687,342, naming David Bolton as first-named inventor, filed on Nov. 18, 2019, entitled "METHOD AND SYSTEM FOR DETECTING MOISTURE LEVELS IN WOOD PRODUCTS USING NEAR INFRARED IMAGING AND MACHINE LEARNING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is also related to U.S. patent application Ser. No. 16/687,369, naming David Bolton as first-named inventor, filed on Nov. 18, 2019, entitled "METHOD AND SYSTEM FOR MOISTURE GRADING WOOD PRODUCTS USING SUPERIMPOSED NEAR INFRARED AND VISUAL IMAGES," which claims the benefit 44156.0117.13021283.1 of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

This application is also related to U.S. patent application Ser. No. 16/697,458, naming David Bolton as first-named inventor, filed Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

This application is related to U.S. patent application Ser. No. 16/697,461, naming David Bolton as first-named inventor, filed on Nov. 27, 2019, entitled "METHOD AND SYSTEM FOR ENSURING THE QUALITY OF A WOOD PRODUCT BASED ON SURFACE IRREGULARITIES USING NEAR INFRARED IMAGING AND MACHINE LEARNING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

This application is also related to U.S. patent application Ser. No. 16/697,466, naming David Bolton as first-named inventor, filed on Nov. 27, 2019, entitled "METHOD AND SYSTEM FOR ADJUSTING THE PRODUCTION PROCESS OF A WOOD PRODUCT BASED ON A LEVEL OF IRREGULARITY OF A SURFACE OF THE WOOD PRODUCT USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

BACKGROUND

There are numerous classes and types of wood products currently used in a virtually limitless variety of construction and other applications. Wood product types include, but are not limited to: raw wood products such as logs, debarked blocks, green or dry veneer, and dimensional lumber; intermediate wood components, such as wood I-beam flanges and webs; and layered wood products such as laminated beams, plywood panels, Laminated Veneer Lumber (LVL), and wood beam/I-beam products.

Layered wood products such as plywood, glued laminated timber, and LVL, are "man-made" composite products made up of layers of wood. LVL is an engineered wood product that uses multiple layers of thin wood, e.g., veneer sheets, assembled with adhesives in layers. LVL offers several advantages over typical milled lumber. For instance, since LVL is "man-made" lumber fabricated in a factory under controlled specifications, it is potentially stronger, straighter, and more uniform than traditional lumber. In addition, due to its composite nature, LVL is much less likely than conventional lumber to warp, twist, bow, or shrink. LVL can also have a higher allowable stress than a comparable lumber milled item. However, as discussed below, to achieve this potential is critical the veneer sheets making up the LVL have correct and/or consistent surface texture and moisture content.

The use of veneer, and particularly veneer that has uniform qualities such as consistent surface texture and moisture content, allows wood products such as LVL of various dimensions to be created without milling a board of the desired thickness or dimension from a single log or single piece of lumber. This, in turn, allows for much more efficient use of natural resources. Indeed, without the use of various layered wood technologies, such as veneer and LVL products, the forests of the planet would have been depleted long ago simply to meet the construction needs of the ever-increasing world population. In addition, since LVL is fabricated in a factory under controlled specifications, LVL can be manufactured to virtually any dimensions desired, including dimensions such as length, width, and height well beyond dimensions that can be provided by milling from even the largest trees.

The use of veneer layers in LVL can also allow for better structural integrity since any imperfections in a given veneer layer, such as a knot hole, can be mitigated by rotating and/or exchanging layers of veneer so that the imperfection is only one layer deep and is supported by layers of veneer below and above the imperfection in the LVL structure.

However, these advantages are again dependent on the veneer layers being of consistent surface texture and moisture content.

Unfortunately, the same layering of veneer that potentially provides so many advantages in LVL structures can also present some drawbacks. For instance, the presence of irregular surfaces in the layered sheets of veneer, i.e., inconsistent surface texture and moisture content, can create problems, such as cracks or other defects, in the LVL product. This, of course, can result in compromised structural integrity of the LVL product and/or undesirable imperfections in the LVL product. Consequently, it is again critical to accurately and efficiently determine the surface texture and moisture content of the veneer sheets used in an LVL products. However, accurately, effectively, and efficiently determining the surface texture and moisture content of the veneer sheets used in an LVL product has historically been a difficult technical problem to solve.

Several recently discovered technical solutions to the technical problem of accurately and efficiently determining the surface texture and moisture content of the veneer sheets used in an LVL product are set forth in the related U.S. Patent Applications incorporated by reference above, the surface texture and moisture content information is used to adjust preconditioning and processing parameters, i.e., production parameters, associated with the veneer sheets and LVL product to conserve resources, ensure safely, and consistently generate high quality layered products, such as LVL. In addition, the disclosed methods and systems are capable of being implemented without significantly slowing down the production process or increasing the cost of the finished wood product.

In addition, when various types of fasteners, plates, or other structures relying on penetrating structures and frictional forces, such as nails, screws, spikes, truss plates, and other attachment devices with penetrating members, are used with LVL, the presence of the layers in the LVL product can interfere with these fasteners/penetrating structures. This is because the fasteners/penetrating structures tend to split the veneer layers and/or lodge between the layers of veneer. As a result, fasteners relying on penetration of the LVL may not achieve sufficient anchoring in the LVL structure. The potential inability to provide sufficient anchoring for fasteners or other penetrating structures in LVL products has historically dictated significant limitations on the use of LVL products.

As a result of the traditional inability to accurately and efficiently detect irregular surfaces and moisture levels in layered sheets of veneer used in LVL products, and the potential inability to provide sufficient anchoring for fasteners or other penetrating structures in LVL products, current teaching is that LVL cannot be used in some structures, such as floor trusses and other heavy weight bearing structures. Consequently, the huge potential of LVL has not been realized and the numerous advantages of LVL products have not been provided to these types of weight bearing structures.

What is needed is a method and system for providing an LVL structure that can be used in heavy weight bearing applications, including LVL floor truss structures, and that can be made compatible with current standard building dimensions and codes.

SUMMARY

Embodiments of the present disclosure provide an effective and efficient technical solution to the technical problem of providing an LVL structure that can be used in heavy weight bearing applications, including LVL floor truss structures, yet is sized such that the LVL structure is compatible with current building dimensions and codes.

In one embodiment, the LVL structure is a rectangular cell suitable for weight bearing uses such as floor trusses. The LVL structure includes one or more LVL beams having first surfaces that are a single outer layer of a veneer stack. Fastening plates/devices having penetrating members are used to attach the one or more LVL beams to the LVL structure with the penetrating members penetrating the single veneer layer first surface of the LVL beams substantially perpendicular to the first surfaces. In this way, the penetrating members do not split/separate the layers of veneer making up the LVL beams and tend to secure the penetrated layers of the veneer making up the one or more LVL beams together in a nail like fashion.

In one embodiment, an LVL structure includes at least two horizontal members and at least two vertical members attached substantially perpendicularly to the at least two horizontal members using fastening plates having fastening/penetrating members. In one embodiment, at least one of the horizontal members of the LVL structure is an LVL beam.

In one embodiment, the LVL beam has an LVL beam first surface that is formed of a single first outer layer of veneer and an LVL beam second surface, opposite the LVL beam first surface, that is formed of a single second outer layer of veneer. In one embodiment, the LVL beam includes one or more inner layers of veneer positioned in the LVL beam between the single first outer layer of veneer and the single second outer layer of veneer such that each of the single first outer layer of veneer, the one of more inner layers of veneer, and the single second outer layer of veneer making up the LVL beam are arranged in layers one atop the other.

In one embodiment, the LVL beam is attached to a first end of the first vertical member and a first end of the second vertical member using at least two fastening plates or devices with penetrating members such that a longitudinal axis of the LVL beam is substantially perpendicular to a longitudinal axis of both the first vertical member and the second vertical member.

In one embodiment, the at least two fastening plates or devices have penetrating members and one or more of the penetrating members penetrates the LVL beam first surface substantially perpendicular to the LVL beam first surface. Consequently, in one embodiment, one or more penetrating members penetrate the LVL beam first surface substantially perpendicular to the surface of the single first outer layer of veneer, one of more inner layers of veneer, and the single second outer layer of veneer making up the LVL beam. In this way, the penetrating members will not separate or split the layers of veneer making up the LVL beam. Indeed, according to the teachings of the invention, if the penetrating members penetrate more than one layer of veneer, the penetrating members tend to secure the penetrated layers of the veneer making up the LVL beam together in a nail like fashion.

In one embodiment, a second horizontal member is attached to the two vertical members. In one embodiment, the second horizontal member is attached to a second end of the first vertical member that is opposite the first end of the first vertical member and a second end of the second vertical member that is opposite the first end of the second vertical member. In one embodiment, the second horizontal member, like the first horizontal member, is an LVL beam.

In one embodiment, the second LVL beam is attached to a second end of the first vertical member and a second end of the second vertical member using at least two fastening plates or devices with penetrating members such that a longitudinal axis of the second LVL beam is substantially perpendicular to a longitudinal axis of both the first vertical member and the second vertical member and substantially parallel to a longitudinal axis of the first LVL beam.

In one embodiment, the at least two fastening plates or devices have penetrating members and one or more of the penetrating members penetrates the second LVL beam first surface substantially perpendicular to the second LVL beam first surface. Consequently, in one embodiment, one or more penetrating members penetrate the second LVL beam first surface substantially perpendicular to the stacked single first outer layer of veneer, one of more inner layers of veneer, and the single second outer layer of veneer making up the second LVL beam. In this way, the penetrating members will not separate or split the layers of veneer making up the second LVL beam. Indeed, according to the teachings of the invention, if the penetrating members penetrate more than one layer of veneer, the penetrating members tend to secure the penetrated layers of the veneer making up the second LVL beam together in a nail like fashion.

As described above, the resulting LVL structure is a rectangular cell structure suitable for weight bearing uses such as floor trusses, wall supports, etc. The disclosed LVL structure uses one or more LVL beams and fastening plates or devices having penetrating members such that the penetrating members penetrate the one or more LVL beams first surface substantially perpendicular to the one or more LVL beams first surface. In this way, the penetrating members will not separate or split the layers of veneer making up the one or more LVL beams. Indeed, according to the teachings of the invention, if the penetrating members penetrate more than one layer of veneer, the penetrating members tend to secure the penetrated layers of the veneer making up the one or more LVL beams together in a nail like fashion.

In one embodiment, the resulting LVL structure is cut to a traditional 2×4 size having actual dimensions of approximately 1.5 inches by 3.5 inches. Consequently, the resulting LVL structure in some embodiments is constructed of industry standard dimensioned members and therefore can be readily incorporated with existing plans and structures.

In one embodiment, the LVL structure is an LVL floor truss structure. In one embodiment, the LVL floor truss structure includes one or more LVL beams having first surfaces that are a single outer layer of a veneer stack. Truss plates having penetrating members are used to attach the one or more LVL beams to the LVL floor truss structure with the penetrating members penetrating the single veneer layer first surface of the LVL beams substantially perpendicular to the first surfaces. In this way, the penetrating members do not split/separate the layers of veneer making up the LVL beams and tend to secure the penetrated layers of the veneer making up the one or more LVL beams together in a nail like fashion.

In one embodiment, an LVL floor truss structure includes at least two horizontal members, at least two vertical members attached substantially perpendicularly to the at least two horizontal members, and at least one diagonal member attached at an angle with respect to a longitudinal axis of the first horizontal member and at an angle with respect to a longitudinal axis of the second horizontal member. In one embodiment, at least one of the at least two horizontal members, at least two vertical members, and the at least one diagonal member are attached using fastening plates having fastening/penetrating members. In one embodiment, at least one of the horizontal members of the LVL floor truss structure is an LVL beam.

In one embodiment, the LVL beam has an LVL beam first surface that is formed of a single first outer layer of veneer and an LVL beam second surface, opposite the LVL beam first surface, that is formed of a single second outer layer of veneer. In one embodiment, the LVL beam includes one or more inner layers of veneer positioned in the LVL beam between the single first outer layer of veneer and the single second outer layer of veneer such that each of the single first outer layer of veneer, the one of more inner layers of veneer, and the single second outer layer of veneer making up the LVL beam are arranged in layers one atop the other.

In one embodiment, the LVL beam is attached to a first end of the first vertical member and a first end of the second vertical member using at least two fastening plates or devices with penetrating members such that a longitudinal axis of the LVL beam is substantially perpendicular to a longitudinal axis of both the first vertical member and the second vertical member.

In one embodiment, the at least two fastening plates or devices have penetrating members and one or more of the penetrating members penetrates the LVL beam first surface substantially perpendicular to the LVL beam first surface. Consequently, in one embodiment, one or more penetrating members penetrate the LVL beam first surface substantially perpendicular to the stacked single first outer layer of veneer, one of more inner layers of veneer, and the single second outer layer of veneer making up the LVL beam. In this way, the penetrating members will not separate or split the layers of veneer making up the LVL beam. Indeed, according to the teachings of the invention, if the penetrating members penetrate more than one layer of veneer, the penetrating members tend to secure the penetrated layers of the veneer making up the LVL beam together in a nail like fashion.

In one embodiment, a second horizontal member is attached to the two vertical members. In one embodiment, the second horizontal member is attached to a second end of the first vertical member that is opposite the first end of the first vertical member and a second end of the second vertical member that is opposite the first end of the second vertical member. In one embodiment, the second horizontal member, like the first horizontal member, is an LVL beam.

In one embodiment, the second LVL beam is attached to a second end of the first vertical member and a second end of the second vertical member using at least two fastening plates or devices with penetrating members such that a longitudinal axis of the second LVL beam is substantially perpendicular to a longitudinal axis of both the first vertical member and the second vertical member and substantially parallel to a longitudinal axis of the first LVL beam.

In one embodiment, the at least two fastening plates or devices have penetrating members and one or more of the penetrating members penetrates the second LVL beam first surface substantially perpendicular to the second LVL beam first surface. Consequently, in one embodiment, one or more penetrating members penetrate the second LVL beam first surface substantially perpendicular to the stacked single first outer layer of veneer, one of more inner layers of veneer, and the single second outer layer of veneer making up the second LVL beam. In this way, the penetrating members will not separate or split the layers of veneer making up the second LVL beam. Indeed, according to the teachings of the invention, if the penetrating members penetrate more than one layer of veneer, the penetrating members tend to secure the penetrated layers of the veneer making up the second LVL beam together in a nail like fashion.

In one embodiment, a first end of the at least one diagonal member is attached to a first (or second) end of the first vertical member and/or first horizontal members and a second end of the at least one diagonal member is attached second (or first) end of the second vertical member and/or horizontal member such that the at least one diagonal member's longitudinal axis is at an angle with respect to a longitudinal axis of the first horizontal member and at an angle with respect to a longitudinal axis of the second horizontal member.

In one embodiment, the at least one diagonal member is an LVL beam. In one embodiment, at least two fastening plates or devices have penetrating members are used to attach the at least one LVL beam diagonal member to the horizontal members and/or vertical members. In one embodiment, one or more of the penetrating members penetrate the LVL beam diagonal member first surface substantially perpendicular to the LVL beam diagonal member first surface. Consequently, in one embodiment, one or more penetrating members penetrate the LVL beam diagonal member first surface substantially perpendicular to the stacked single first outer layer of veneer, one of more inner layers of veneer, and the single second outer layer of veneer making up the LVL beam diagonal member. In this way, the penetrating members will not separate or split the layers of veneer making up the LVL beam diagonal member. Indeed, according to the teachings of the invention, if the penetrating members penetrate more than one layer of veneer, the penetrating members tend to secure the penetrated layers of the veneer making up the LVL beam diagonal member together in a nail like fashion.

As described above, the resulting LVL floor truss structure is a rectangular cell structure suitable for weight bearing uses. The disclosed LVL floor truss structure uses one or more LVL beams and fastening plates or devices having penetrating members such that the penetrating members penetrate the one or more LVL beams first surface substantially perpendicular to the one or more LVL beams first surface. In this way, the penetrating members will not separate or split the layers of veneer making up the one or more LVL beams. Indeed, according to the teachings of the invention, if the penetrating members penetrate more than one layer of veneer, the penetrating members tend to secure the penetrated layers of the veneer making up the one or more LVL beams together in a nail like fashion.

In one embodiment, the resulting LVL floor truss structure is cut to a traditional 2×4 size having actual dimensions of approximately 1.5 inches by 3.5 inches. Consequently, the resulting LVL floor truss structure in some embodiments is constructed of industry standard dimensioned members and therefore can be readily incorporated with existing plans and structures.

As a result of these and other disclosed features, which are discussed in more detail below, the disclosed embodiments address the short comings of the prior art and the LVL structures disclosed herein provide an effective and efficient technical solution to the technical problem of providing an LVL structure that can be used in heavy weight bearing applications, including LVL floor truss structures, yet is sized such that the LVL structure is compatible with current building dimensions and codes.

Figure 1A:
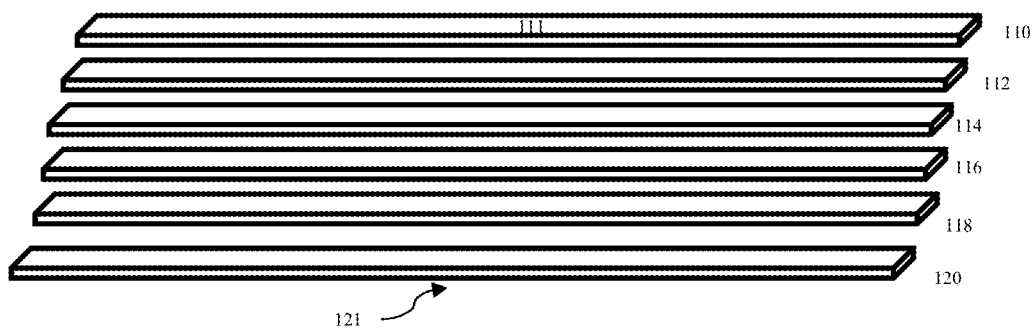
FIG. 1A shows layers of veneer that are stacked to create an LVL beam for use in constructing an LVL structure in accordance with one embodiment.
Figure 1B:
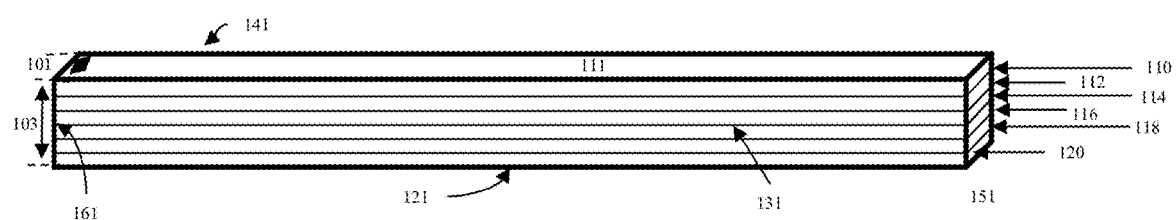
FIG. 1B shows a first perspective view of an LVL beam for use in constructing an LVL structure in accordance with one embodiment.
Figure 1C:
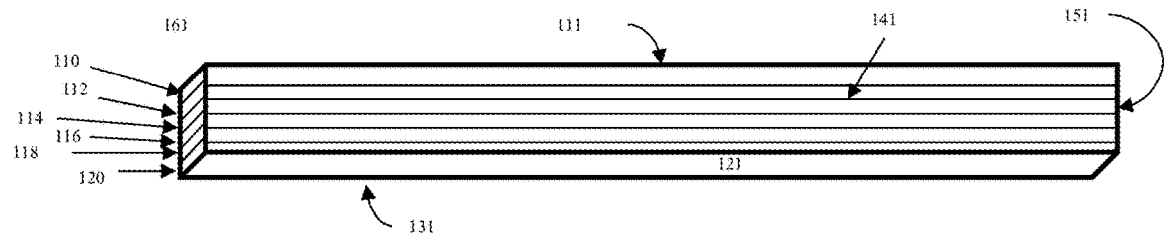
FIG. 1C shows a second perspective view of an LVL beam for use in constructing an LVL structure in accordance with one embodiment.

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

In one embodiment, the disclosed LVL structure is a rectangular cell suitable for weight bearing uses such as floor trusses. The LVL structure includes one or more LVL beams having first surfaces that are a single outer layer of a veneer stack. Fastening plates/devices having penetrating members are used to attach the one or more LVL beams to the LVL structure with the penetrating members penetrating the single veneer layer first surface of the LVL beams substantially perpendicular to the first surfaces. In this way, the penetrating members do not split/separate the layers of veneer making up the LVL beams and tend to secure the penetrated layers of the veneer making up the one or more LVL beams together in a nail like fashion.

In one embodiment, the LVL structure includes at least two horizontal members and at least two vertical members attached substantially perpendicular to the at least two horizontal members using fastening plates having fastening/penetrating members. In one embodiment, at least one of the horizontal members of the LVL structure is an LVL beam.

In one embodiment, processed veneer layers are used to create at least one LVL beam. In one embodiment, the LVL beam has an LVL beam first surface that is formed of a single first outer layer of veneer and an LVL beam second surface, opposite the LVL beam first surface, that is formed of a single second outer layer of veneer. In one embodiment, the LVL beam includes one or more inner layers of veneer positioned in the LVL beam between the single first outer layer of veneer and the single second outer layer of veneer such that each of the single first outer layer of veneer, the one of more inner layers of veneer, and the single second outer layer of veneer making up the LVL beam are arranged in layers one atop the other.

In one embodiment, the LVL beam has an LVL beam third surface and an LVL beam fourth surface opposite the LVL beam third surface. In one embodiment, both the LVL beam third surface and the LVL beam fourth surface are substantially perpendicular to both the LVL beam first surface and LVL beam second surface. In one embodiment, the LVL beam third surface and the LVL beam fourth surface comprise respective side portions of each of the single first outer layer of veneer, the one of more inner layers of veneer, and the single second outer layer of veneer making up the LVL beam stacked one upon the other.

In one embodiment, the LVL beam has an LVL beam fifth surface and an LVL beam sixth surface opposite the LVL beam fifth surface. In one embodiment, both the LVL beam fifth surface and the LVL beam sixth surface are substantially perpendicular to the LVL beam first surface, the LVL beam second surface, the LVL beam third surface, and the LVL beam fourth surface. In one embodiment, the LVL beam fifth surface and the LVL beam sixth surface comprise respective end portions of each of the single first outer layer of veneer, the one of more inner layers of veneer, and the single second outer layer of veneer making up the LVL beam stacked one upon the other.

In one embodiment, the LVL beam is cut to a traditional 2×4 size having actual dimensions of approximately 1.5 inches by 3.5 inches. In this embodiment, the first and second LVL beam surfaces measure approximately 1.5 inches in height, i.e., the LVL beam is cut to approximately 1.5 inches. In this embodiment, the third, fourth, fifth, and sixth LVL beam surfaces measure approximately 3.5 inches in width, e.g., the single first outer layer of veneer, the one of more inner layers of veneer, and the single second outer layer of veneer making up the LVL beam are stacked 3.5 inches thick in the final LVL beam.

In one embodiment, the at least one LVL beam is used as a first horizontal member of the LVL structure. To this end, in one embodiment, the LVL beam is attached to a first end of the first vertical member and a first end of the second vertical member.

In one embodiment, the first and second vertical members are traditional lumber members. In one embodiment, the first and second vertical members are traditional 2×4 lumber members having actual dimensions of approximately 1.5 inches by 3.5 inches.

In one embodiment, the first and second vertical members are also LVL beams. In one embodiment, the vertical member LVL beams are cut to a traditional 2×4 size having actual dimensions of approximately 1.5 inches by 3.5 inches. In this embodiment, the first and second LVL beam surfaces measure approximately 1.5 inches in height, i.e., the LVL beam is cut to approximately 1.5 inches. In this embodiment, the third, fourth, fifth, and sixth LVL beam surfaces have a width measurement of approximately 3.5 inches, e.g., the single first outer layer of veneer, the one of more inner layers of veneer, and the single second outer layer of veneer making up the LVL beam are stacked 3.5 inches thick in the final LVL beam.

In one embodiment, the at least one LVL beam is attached to the first end of the first vertical member and the first end of the second vertical member using at least two fastening plates or devices with penetrating members such that a longitudinal axis of the LVL beam is substantially perpendicular to a longitudinal axis of both the first vertical member and the second vertical member.

In one embodiment, the at least one LVL beam is attached to the first and second vertical members using at least two fastening plates or devices having penetrating members such that each of the penetrating members penetrate the LVL beam first surface substantially perpendicular to the LVL beam first surface. Consequently, in one embodiment, the penetrating members penetrate the LVL beam first surface substantially perpendicular to the stacked single first outer layer of veneer, one of more inner layers of veneer, and the single second outer layer of veneer making up the LVL beam. In this way, the penetrating members will not separate or split the layers of veneer making up the LVL beam. Indeed, according to the teachings of the invention, if the penetrating members penetrate more than one layer of veneer, the penetrating members tend to secure the penetrated layers of the veneer making up the LVL beam together in a nail like fashion.

In one embodiment, a second horizontal member is attached to the two vertical members. In one embodiment, the second horizontal member is attached to a second end of the first vertical member that is opposite the first end of the first vertical member and a second end of the second vertical member that is opposite the first end of the second vertical member. In one embodiment, second horizontal member is attached to the two vertical members using at least two fastening plates or devices with penetrating members such that a longitudinal axis of the second horizontal member is perpendicular to the longitudinal axis of the two vertical members and parallel to the longitudinal axis of the LVL beam first horizontal axis.

In one embodiment, the second horizontal member, like the first horizontal member is an LVL beam. In this embodiment, the at least one LVL beam is attached to the first and second vertical members using at least two fastening plates or devices having penetrating members such that each of the penetrating members penetrate the LVL beam first surface substantially perpendicular to the LVL beam first surface. Consequently, in one embodiment, the penetrating members penetrate the LVL beam first surface substantially perpendicular to the stacked single first outer layer of veneer, one of more inner layers of veneer, and the single second outer layer of veneer making up the LVL beam. In this way, the penetrating members will not separate or split the layers of veneer making up the LVL beam. Indeed, according to the teachings of the invention, if the penetrating members penetrate more than one layer of veneer, the penetrating members tend to secure the penetrated layers of the veneer making up the LVL beam together in a nail like fashion.

In one embodiment, the LVL beam is cut to a traditional 2×4 size having actual dimensions of approximately 1.5 inches by 3.5 inches. In this embodiment, the first and second LVL beam surfaces have a height measurement of approximately 1.5 inches, i.e., the LVL beam is cut to approximately 1.5 inches. In this embodiment, the third, fourth, fifth, and sixth LVL beam surfaces have a height measurement of approximately 3.5 inches, e.g., the single first outer layer of veneer, the one of more inner layers of veneer, and the single second outer layer of veneer making up the LVL beam are stacked 3.5 inches thick in the final LVL beam.

As described above, the resulting LVL structure is a rectangular cell structure suitable for weight bearing uses such as floor trusses, wall supports, etc. The disclosed LVL structure uses LVL beams constructed with veneer layers and includes orientating the LVL beams and fastening plates or devices having penetrating members such that the penetrating members penetrate the LVL beam first surface substantially perpendicular to the LVL beam first surface. Consequently, the penetrating members penetrate the LVL beam first surface substantially perpendicular to the stacked single first outer layer of veneer, one or more inner layers of veneer, and the single second outer layer of veneer making up the LVL beam. In this way, the penetrating members will not separate or split the layers of veneer making up the LVL beam. Indeed, according to the teachings of the invention, if the penetrating members penetrate more than one layer of veneer, the penetrating members tend to secure the penetrated layers of the veneer making up the LVL beam together in a nail like fashion.

As also noted above, in one embodiment, each LVL beam used is cut to a traditional 2×4 size having actual dimensions of approximately 1.5 inches by 3.5 inches. In this embodiment, the first and second LVL beam surfaces height of each LVL beam are approximately 1.5 inches, i.e., the LVL beam is cut to approximately 1.5 inches. In this embodiment, the third, fourth, fifth, and sixth surfaces of each LVL beam have a width measurement of approximately 3.5 inches, e.g., the single first outer layer of veneer, the one of more inner layers of veneer, and the single second outer layer of veneer making up the LVL beams are stacked 3.5 inches thick in the final LVL beam In addition, in one embodiment, each of the vertical and/or horizontal members that are not LVL beams are also cut to a traditional 2×4 size having actual dimensions of approximately 1.5 inches by 3.5 inches. Consequently, the resulting LVL structure in some embodiments is constructed of industry standard dimensioned members and therefore can be readily incorporated with existing plans and structures.

Figure 2A:
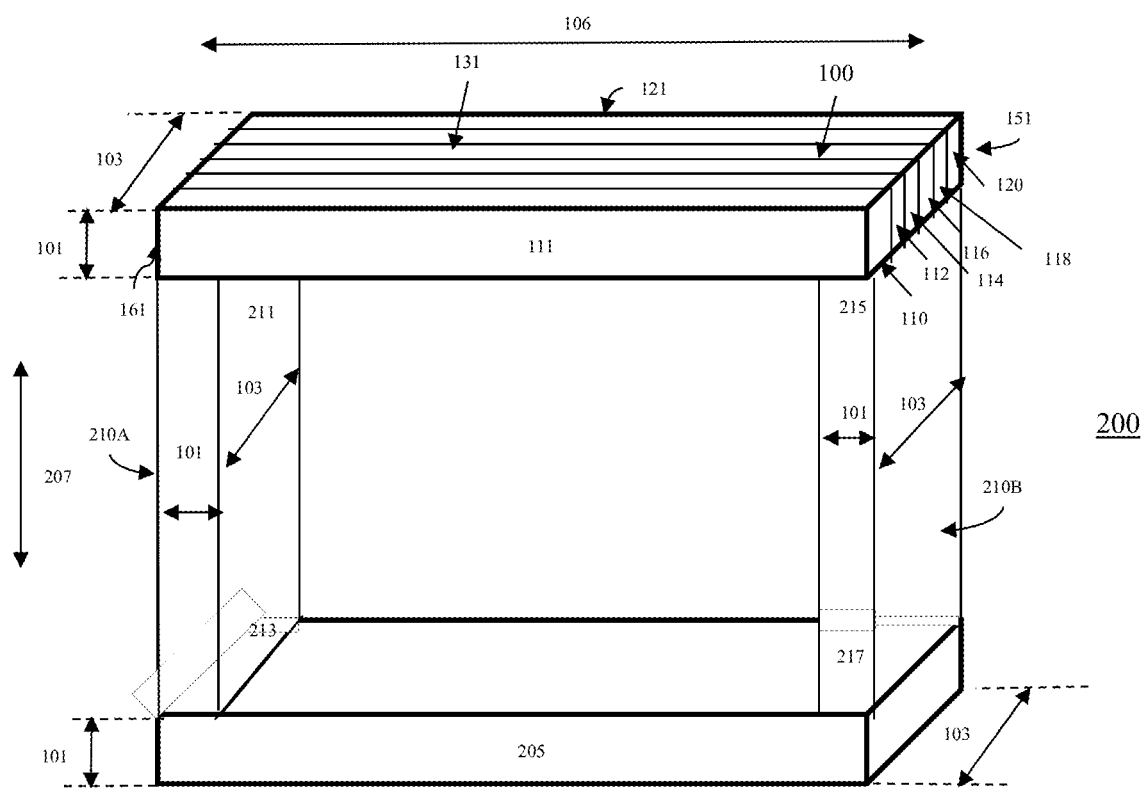
FIG. 2A is a perspective view of an LVL structure including one LVL beam horizontal member before attaching fastening plates in accordance with one embodiment.
Figure 2B:
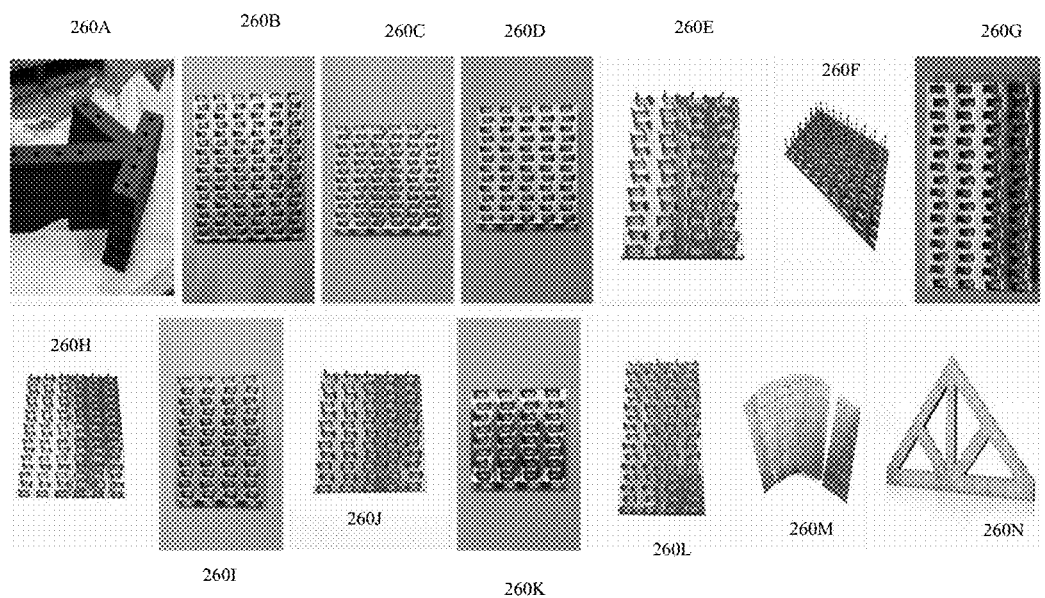
FIG. 2B shows several different examples of fastening plates that can be used to construct an LVL structure in accordance with one embodiment.
Figure 2C:
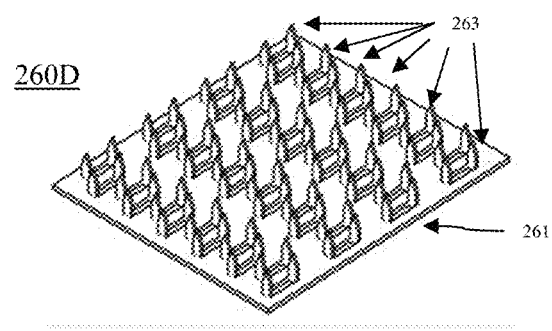
FIG. 2C shows a specific illustrative example of a fastening plate that can be used to construct one illustrative example of an LVL structure in accordance with one embodiment.
Figure 2D:
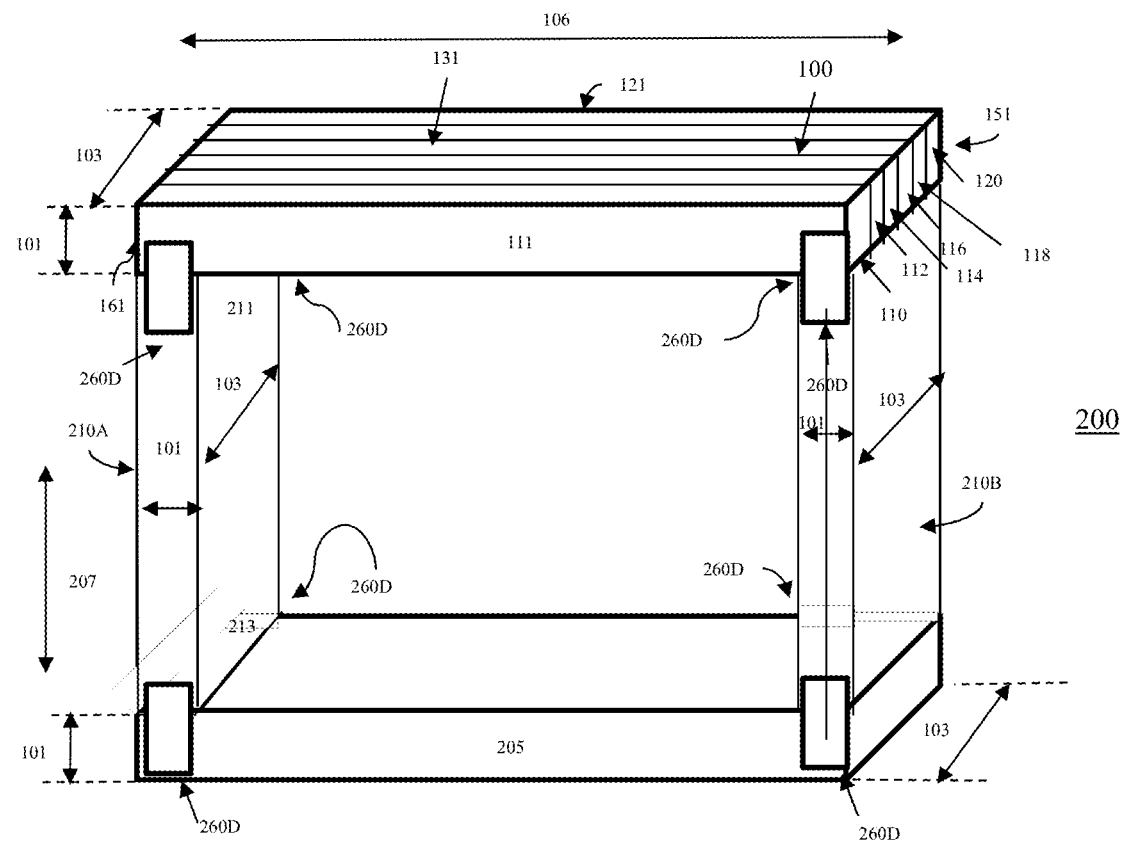
FIG. 2D is a perspective view of an LVL structure including one LVL beam horizontal member after attaching fastening plates in accordance with one embodiment.

Referring to FIGS. 2A, 2B, 2C, 2D, 3C and 3D together, in one embodiment, an LVL structure 200 includes at least two horizontal members 100 and 205 and at least two vertical members 210A and 210B attached substantially perpendicularly to the at least two horizontal members 100 and 205 using fastening devices 260D having fastening/penetrating members 263 (FIG. 2D).

In one embodiment, at least one horizontal member of the LVL structure 200 is an LVL beam 100. Referring to FIGS. 1A, 1B, 1C, 1D, and 1E together, in one embodiment, the LVL beam 100 includes layers, or sheets, of veneer 110, 112, 114, 116, 118, 120.

In one embodiment, veneer layers 110, 112, 114, 116, 118, 120 have been subjected to at least one of the methods and systems described in the related U.S. Patent Applications incorporated by reference above to accurately and efficiently detect irregular surfaces and moisture levels in layered sheets of veneer 110, 112, 114, 116, 118, 120. In one embodiment, only those sheets of veneer determined to have consistent and compatible surfaces and moisture levels using one or more of the methods and systems described in the related U.S. Patent Applications incorporated by reference above are incorporated as layered sheets of veneer 110, 112, 114, 116, 118, 120 to construct the LVL beam 100.

In FIG. 1A, and in the following discussion and subsequent drawings, LVL beam 100 is shown as being made of only five veneer sheets or layers 110, 112, 114, 116, 118, 120. The use of these mere five layers is made for strictly illustrative purposes. Those of skill in the art will readily recognize that in practice LVL beam 100 would most often be made up of tens, hundreds, or even thousands of veneer sheets or layers. Consequently, the use of only five veneer sheets or layers 110, 112, 114, 116, 118, 120 in the discussions herein is for illustrative purposes only.

In one embodiment, the processed veneer layers 110, 112, 114, 116, 118, and 120 are used to create at least one LVL beam 100 using various methods known to those of skill in the art. As seen from various perspectives in FIGS. 1B, 1C, 1D, and 1E, in one embodiment, the LVL beam 100 has an LVL beam first surface 111 that is formed of a single first outer layer of veneer 110 and an LVL beam second surface 121, opposite the LVL beam first surface 111, that is formed of a single second outer layer of veneer 120. In one embodiment, the LVL beam 100 includes one or more inner layers of veneer 112, 114, 116 and 118, positioned in the LVL beam 100 between the single first outer layer of veneer 110 and the single second outer layer of veneer 120 such that each of the single first outer layer of veneer 110, the one of more inner layers of veneer 112, 114, 116, and 118, and the single second outer layer of veneer 120 making up the LVL beam 100 are arranged in layers one atop the other as seen in FIGS. 1A, 1B, 1C, 1D, and 1E.

As seen from various perspectives in FIGS. 1A, 1B, 1C, 1D, and 1E, in one embodiment, the LVL beam 100 has an LVL beam third surface 131 and an LVL beam fourth surface 141, opposite the LVL beam third surface 131. In one embodiment, both the LVL beam third surface 131 and the LVL beam fourth surface 141 are substantially perpendicular to both the LVL beam first surface 111 and LVL beam second surface 121. In one embodiment, the LVL beam third surface 131 and the LVL beam fourth surface 141 comprise respective side portions of each of the single first outer layer of veneer 110, the one of more inner layers of veneer 112, 114, 116, and 118, and the single second outer layer of veneer 120 making up the LVL beam 100 stacked one upon the other.

In one embodiment, the LVL beam 100 has an LVL beam fifth surface 151 and an LVL beam sixth surface 161, opposite the LVL beam fifth surface 151. In one embodiment, both the LVL beam fifth surface 151 and the LVL beam sixth surface 161 are substantially perpendicular to the LVL beam first surface 111, the LVL beam second surface 121, the LVL beam third surface 131, and the LVL beam fourth surface 141. In one embodiment, the LVL beam fifth surface 151 and the LVL beam sixth surface 161 comprise respective end portions of each of the single first outer layer of veneer 110, the one of more inner layers of veneer 112, 114, 116, and 118, and the single second outer layer of veneer 120 making up the LVL beam 100 stacked one upon the other.

In one embodiment, the LVL beam 100 is cut to a traditional 2×4 size having an actual height dimension 101 of approximately 1.5 inches and an actual width dimension 103 of 3.5 inches. In this embodiment, the LVL beam 100 first and second surfaces 111 and 121 have a height dimension 101 of approximately 1.5 inches, i.e., the LVL beam 100 is cut to approximately 1.5 inches. In this embodiment, the third, fourth, fifth, and sixth LVL beam surfaces 131, 141, 151, And 161, have a width dimension 103 of approximately 3.5 inches, e.g., the single first outer layer of veneer 110, the one of more inner layers of veneer 112, 114, 116, and 118, and the single second outer layer of veneer 120 making up the LVL beam 100 are stacked 3.5 inches thick in the final LVL beam.

Figure 1D:
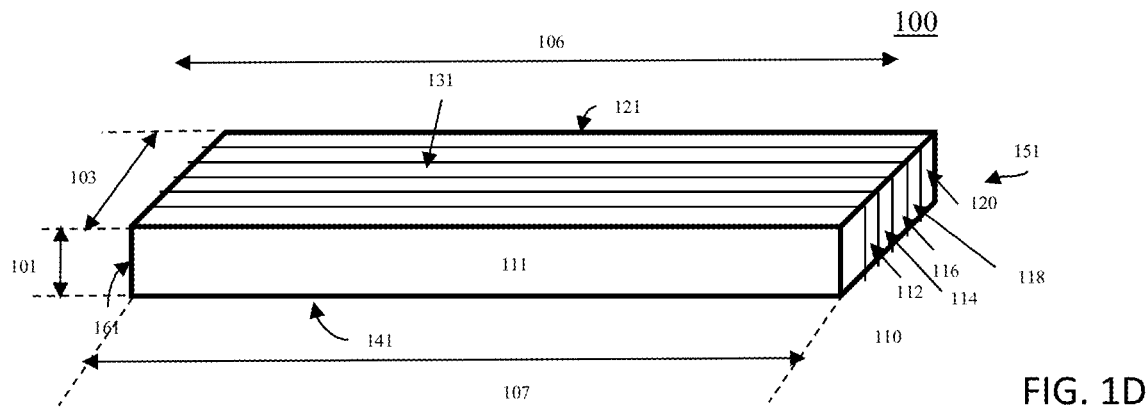
FIG. 1D shows a third perspective view of an LVL beam for use in constructing an LVL structure in accordance with one embodiment.
Figure 1E:
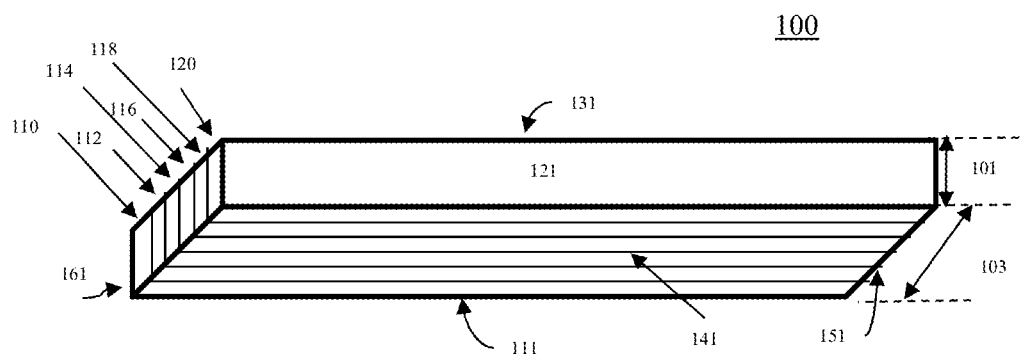
FIG. 1E shows a fourth perspective view of an LVL beam for use in constructing an LVL structure in accordance with one embodiment.

As seen in FIG. 1D, the LVL beam 100 has a length 107 along longitudinal axis 106. In various embodiments, length 107 can be in the range of several feet to over a hundred feet depending on the application, local building codes, and the size and layout of the parent structure using LVL beam 100. However, as noted above, since LVL beam 100 is fabricated in a factory under controlled specifications, beam 100 can be manufactured to virtually any dimensions desired, including dimensions such as length 107, height 101, and width 103, well beyond dimensions that can be provided by milling from even the largest trees.

Referring to FIG. 2A, in one embodiment, at least one LVL beam 100 is used as a first horizontal member of the LVL structure 200. To this end, as shown in FIGS. 2A, 2B, and 2C, in one embodiment, the LVL beam 100 is attached to a first vertical member 210A and a second vertical member 210B. In one embodiment, the LVL beam 100 is attached to a first end 211 of the first vertical member 210A and a first end 215 of the second vertical member 210B.

In one embodiment, the first and second vertical members 210A and 210B are traditional lumber members. In one embodiment, the first and second vertical members 210A and 210B are traditional 2×4 lumber members having actual thickness dimension 101 of approximately 1.5 inches and width dimension 103 of 3.5 inches.

In one embodiment, the first and second vertical members 210A and 210B, are also LVL beams (not shown). In one embodiment, the vertical member LVL beams are cut to a traditional 2×4 size having actual dimensions of approximately 1.5 inches by 3.5 inches. In this embodiment, the first and second LVL beam surfaces and measure approximately 1.5 inches, i.e., the LVL beams are cut to approximately 1.5 inches. In this embodiment, the third, fourth, fifth, and sixth LVL beam surfaces measure approximately 3.5 inches, e.g., the single first outer layer of veneer, the one of more inner layers of veneer, and the single second outer layer of veneer making up the LVL beams are stacked 3.5 inches thick in the final LVL beams.

Referring to FIG. 2B, FIG. 2C, and FIG. 2D, in one embodiment, the LVL beam 100 is attached to the first end 211 of the first vertical member 210A and the first end 215 of the second vertical member 210B using at least two of fastening plates or devices 260A through 260N with penetrating members 263 such that a longitudinal axis 106 of the LVL beam 100 is substantially perpendicular to a longitudinal axis 207 of both the first vertical member 210A and the second vertical member 210B.

Referring to back to FIG. 2A, in one embodiment, a second horizontal member 205 is attached to the two vertical members 201A and 210B. In one embodiment, the second horizontal member 205 is attached to a second end 213 of the first vertical member 210A that is opposite the first end 211 of the first vertical member 210A and a second end 217 of the second vertical member 210B that is opposite the first end 215 of the second vertical member 210B such that a longitudinal axis 106 of the second horizontal member 205 is substantially perpendicular to a longitudinal axis 207 of both the first vertical member 210A and the second vertical member 210B.

As noted above and shown in FIG. 2D, in one embodiment, the LVL beam 100, and second horizontal member 205, are attached to the first and second vertical members 210A and 210B using at least two fastening plates or devices having penetrating members. FIG. 2B shows several examples of fastening devices 260A through 260N known in the art and available at the time of filing. Some fastening devices are plates of various shapes and sizes. All fastening devices include some form of penetrating member that is designed to penetrate the various members making up LVL structure 200. In some cases, such as screws and nails, the penetrating member is the fastener. In other cases, such as the plate-based fasteners of FIG. 2B and FIG. 2C, the penetrating member is a separate and/or integral part of the plate-based fastener. In all cases, the fastener includes a penetrating member that pierces or penetrates a surface of at least one member of the LVL structure.

As noted above, when fasteners relying on penetrating structures and frictional forces, such as nails, screws, or spikes, are used with LVL, the presence of the layers in the LVL product can interfere with these fasteners/penetrating members. This is because the fasteners/penetrating members tend to split the veneer layers 110, 112, 114, 116, 118 and 120 and/or lodge between the layers of veneer 110, 112, 114, 116, 118 and 120. As a result, fasteners relying on penetration of the LVL product may not achieve sufficient anchoring in the LVL product. The potential inability to provide sufficient anchoring for fasteners or other penetrating structures in LVL products has dictated significant limitations on the use of LVL products.

As a result of the traditional inability to provide sufficient anchoring for fasteners or other penetrating structures in LVL products, current teaching is that LVL cannot be used in some structures, such as floor trusses and other heavy weight bearing structures. Consequently, the huge potential of LVL has not been realized and the numerous advantages of LVL products have not been provided to these types of weight bearing structures.

However, according to the disclosed embodiments, at least some of the penetrating members 263 penetrate the LVL beam 100 first surface 111 substantially perpendicular to the LVL beam 100 first surface 111. Consequently, in one embodiment, the penetrating members penetrate the LVL beam first surface 111 substantially perpendicular to the stacked single first outer layer of veneer 110, one of more inner layers of veneer 112, 114, 116, and 118, and the single second outer layer of veneer 120 making up the LVL beam. In this way, the penetrating members will not separate or split the layers of veneer 110, 112, 114, 116, and 118 making up the LVL beam. Indeed, according to the teachings of the invention, if the penetrating members penetrate more than one layer of veneer, the penetrating members tend to secure the penetrated layers of the veneer making up the LVL beam 100 together in a nail like fashion. (See FIGS. 3C and 3D).

FIG. 2C shows a particular fastener plate 260D from FIG. 2B that will be discussed herein. While fastener plate 260D is used herein for illustrative purposes, it is to be understood that any fastener having one or more penetrating members, as discussed herein, known in the art at the time of filing, and/or are becomes known after the time of filing, could be used.

Referring to FIG. 2C, fastener plate 260D includes a plate frame 261 and integrally formed penetrating members 263 arranged in rows. Fastener plates such as fastener plate 260D are often referred to in the art as truss plates.

Referring to FIG. 2D, in one embodiment, the LVL beam 100 is attached to the first and second vertical members 210A and 210B using at least two fastening devices 260D having penetrating members 263 such that some of the penetrating members 260D penetrate the LVL beam 100 first surface 111 substantially perpendicular to the LVL beam 100 first surface 111 and some of the penetrating members 263 penetrate ends 211 or 215 of vertical members 210A and 210B. (See FIGS. 3C and 3D).

In one embodiment, the LVL beam 100 is attached to the first and second vertical members 210A and 210B using at least four fastening devices 260D having penetrating members 263 such that some of the penetrating members of 263 penetrate the LVL beam 100 first surface 111 substantially perpendicular to the LVL beam 100 first surface 111 and some of the penetrating members of 263 penetrate the LVL beam 100 second surface 121 substantially perpendicular to the LVL beam 100 second surface 121 as well as opposite surface of ends 211 or 215 of vertical members 210A and 210B. In this way LVL beam 100 is joined and supported to vertical members 210A and 210B. (See FIGS. 3C and 3D).

As discussed, in this arrangement, the penetrating members 263 penetrate the LVL beam 100 first surface 111 substantially perpendicular to the stacked single first outer layer of veneer 110, one of more inner layers of veneer 112, 114, 116, 118, and the single second outer layer 120 of veneer making up the LVL beam 100. In this way, the penetrating members 263 will not separate or split the layers of veneer 110, 112, 114, 116, 118, and 120 making up the LVL beam 100. (See FIGS. 3C and 3D).

Indeed, according to the teachings of the invention, if the penetrating members 263 penetrate more than one layer of veneer 110, 112, 114, 116, 118, and 120, the penetrating members 263 tend to secure the penetrated layers of the veneer 110, 112, 114, 116, 118, and 120 making up the LVL beam 100 together in a nail like fashion. (See FIGS. 3C and 3D).

In one embodiment, the second horizontal member 205 is attached to the two vertical members 201A and 210B. In one embodiment, the second horizontal member 205 is attached to a second end 213 of the first vertical member 210A that is opposite the first end 211 of the first vertical member 210A and a second end 217 of the second vertical member 210B that is opposite the first end 215 of the second vertical member 210B. In one embodiment, the second horizontal member 205 is attached to the two vertical members 201A and 210B using at least two fastening devices 260D having penetrating members 263 such that some of the penetrating members 260D penetrate the horizontal member 205 and some of the penetrating members 263 penetrate ends 213 or 217 of vertical members 210A and 210B. In one embodiment, the second horizontal member 205 is attached to the two vertical members 201A and 210B using at least four fastening devices 260D having penetrating members 263 such that some of the penetrating members 263 penetrate the horizontal member 205 on both sides of horizontal member 205 and some of the penetrating members 263 penetrate as opposite surfaces of ends 213 or 217 of vertical members 210A and 210B. (See FIGS. 3C and 3D).

Figure 3A:
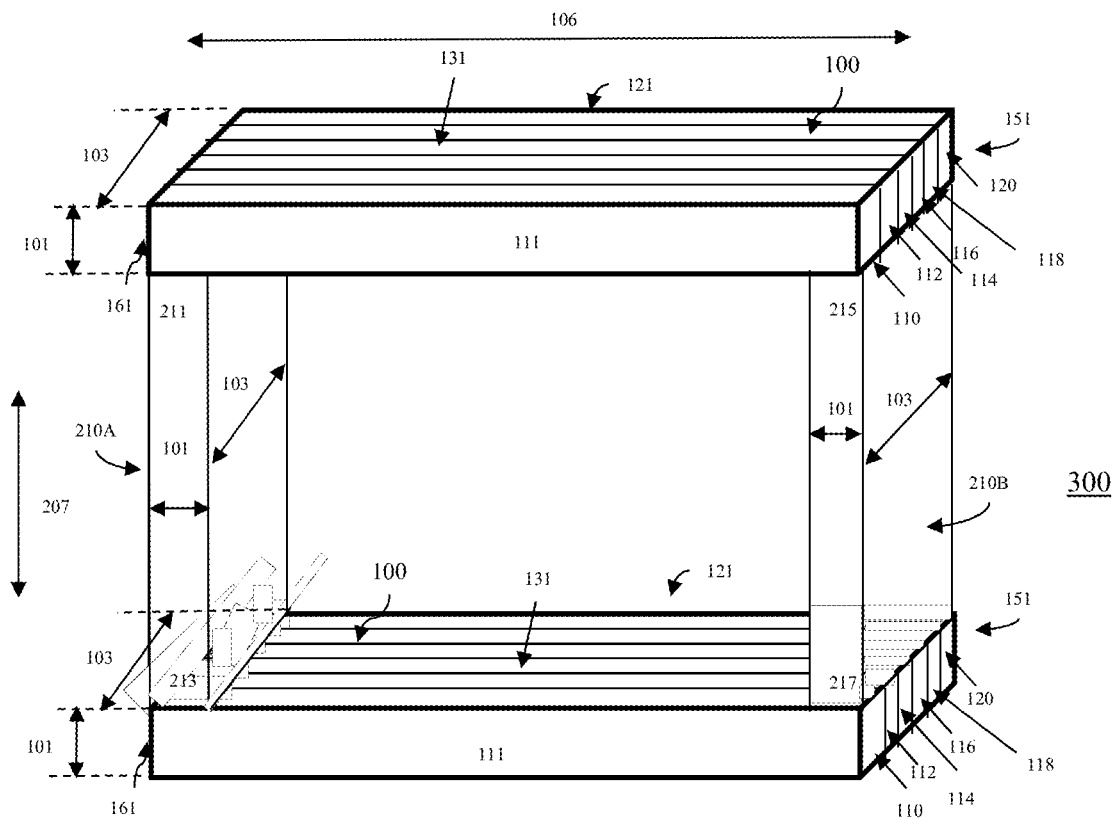
FIG. 3A is a perspective view of an LVL structure including two LVL beam horizontal members before attaching fastening plates in accordance with one embodiment.

FIG. 3A is a perspective view of an LVL structure including two LVL beam horizontal members 100 before attaching fastening plates in accordance with one embodiment. As shown in FIG. 3A, in one embodiment, the second horizontal member, like the first horizontal member, is an LVL beam 100.

Figure 3B:
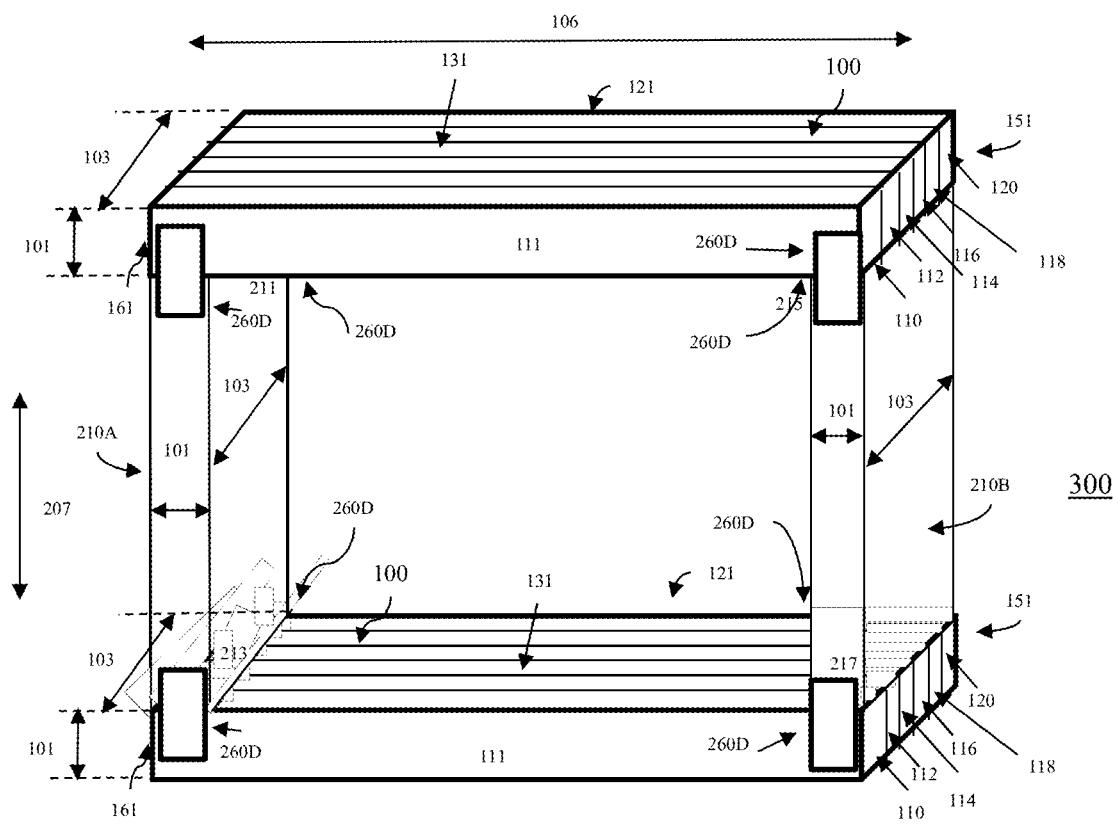
FIG. 3B is a perspective view of an LVL structure including two LVL beam horizontal members after attaching fastening plates in accordance with one embodiment.

FIG. 3B is a perspective view of an LVL structure including two LVL beam horizontal members after attaching fastening plates in accordance with one embodiment. As seen in FIG. 3B, in this embodiment, the second LVL beam 100 is attached to the first and second vertical members 210A and 210B using at least two more fastening devices 260D having penetrating members 263 such that some of the penetrating members 260D penetrate the second LVL beam 100 first surface 111 substantially perpendicular to the second LVL beam 100 first surface 111 and some of the penetrating members 263 penetrate ends 213 or 217 of vertical members 210A and 210B. In this way second LVL beam 100 is joined and supported to vertical members 210A and 210B. (See FIGS. 3C and 3D).

In one embodiment, the second LVL beam 100 is attached to the first and second vertical members 210A and 210B using at least four fastening devices 260D having penetrating members 263 such that some of the penetrating members of 263 penetrate the second LVL beam 100 first surface 111 substantially perpendicular to the second LVL beam 100 first surface 111 and some of the penetrating members of 263 penetrate the second LVL beam 100 second surface 121 substantially perpendicular to the second LVL beam 100 second surface 121 as well as opposite surfaces of ends 215 or 217 of vertical members 210A and 210B. In this way second LVL beam 100 is joined and supported to vertical members 210A and 210B. (See FIGS. 3C and 3D)

As discussed, in this arrangement, the penetrating members 263 penetrate the second LVL beam 100 first surface 111 substantially perpendicular to the stacked single first outer layer of veneer 110, one of more inner layers of veneer 112, 114, 116, 118, and the single second outer layer 120 of veneer making up the second LVL beam 100. In this way, the penetrating members 263 will not separate or split the layers of veneer 110, 112, 114, 116, 118, and 120 making up the second LVL beam 100. (See FIGS. 3C and 3D).

Indeed, according to the teachings of the invention, if the penetrating members 263 penetrate more than one layer of veneer 110, 112, 114, 116, 118, and 120, the penetrating members 263 tend to secure the penetrated layers of the veneer 110, 112, 114, 116, 118, and 120 making up the second LVL beam 100 together in a nail like fashion. (See FIGS. 3C and 3D)

In one embodiment, the LVL beams are cut to a traditional 2×4 size having actual dimensions of approximately 1.5 inches by 3.5 inches. In this embodiment, the LVL beams first and second surfaces 111 and 121 have a height measurement 101 of approximately 1.5 inches, i.e., the LVL beams are cut to approximately 1.5 inches. In this embodiment, the third, fourth, fifth, and sixth LVL beam surfaces 131, 141, 151, 161, have a width measurement 103 of approximately 3.5 inches, e.g., the single first outer layer of veneer 110, the one of more inner layers of veneer 112, 114, 116, and 118, and the single second outer layer of veneer 120 making up the LVL beams are stacked 3.5 inches thick in the final LVL beams.

Figure 3C:
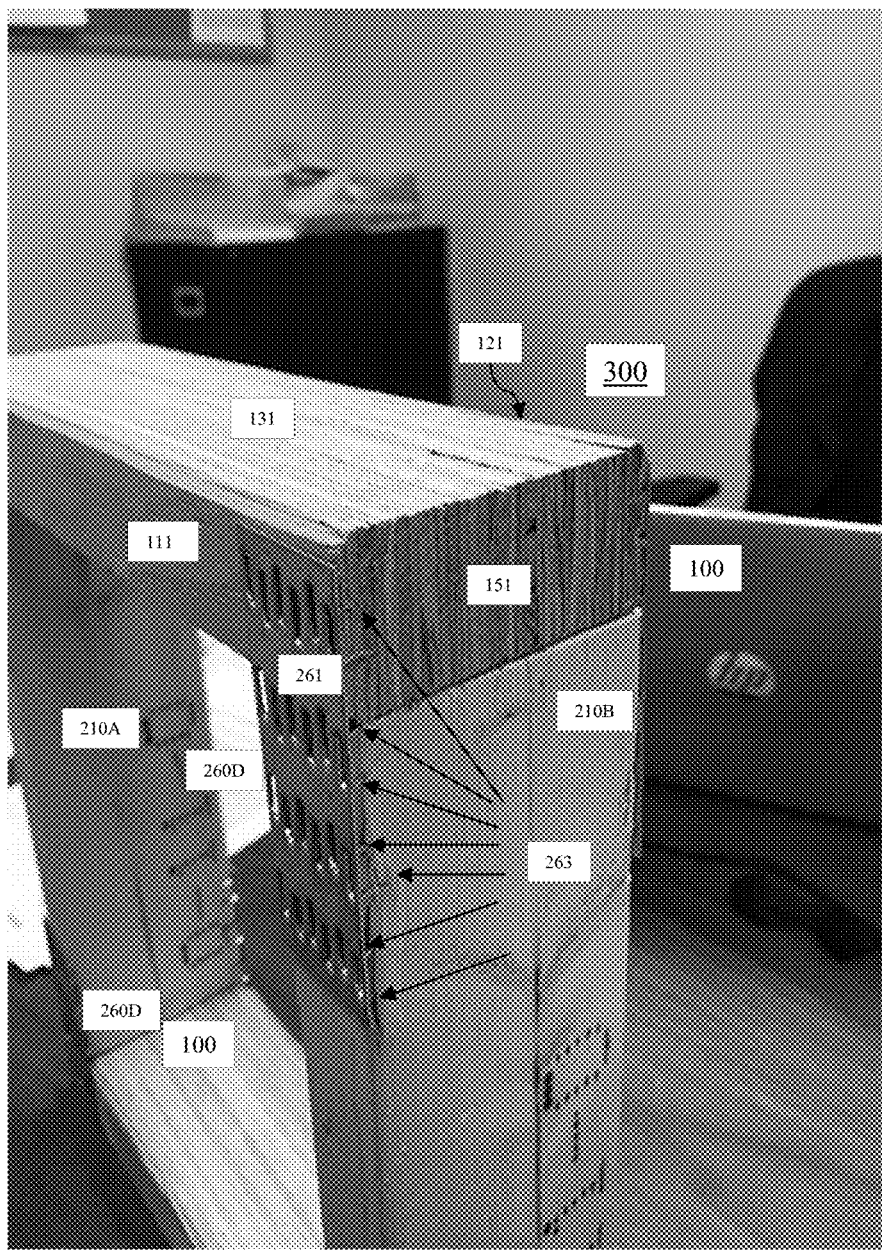
FIG. 3C is a photograph of a first perspective view of an LVL structure including two LVL beams in accordance with one embodiment.

FIG. 3C is a photograph of a first perspective view of one example of an LVL structure 300 including two LVL beams of FIG. 3B in accordance with one embodiment. Shown in FIG. 3C are two LVL beam 100 horizontal members, LVL beam first surface 111, LVL third surface 131, LVL beam fifth surface 151, vertical members 210A and 210B, and fastening devices 260D including frame plate 216 and penetrating members 263 shown penetrating LVL beam first surface 111 perpendicularly to LVL beam first surface 111. As noted above, this is a highly advantageous feature of the disclosed embodiments, since, according to the teachings herein, if the penetrating members 263 penetrate more than one layer of veneer the penetrating members 263 tend to secure the penetrated layers of the veneer making up the LVL beam 100 together in a nail like fashion.

Figure 3D:
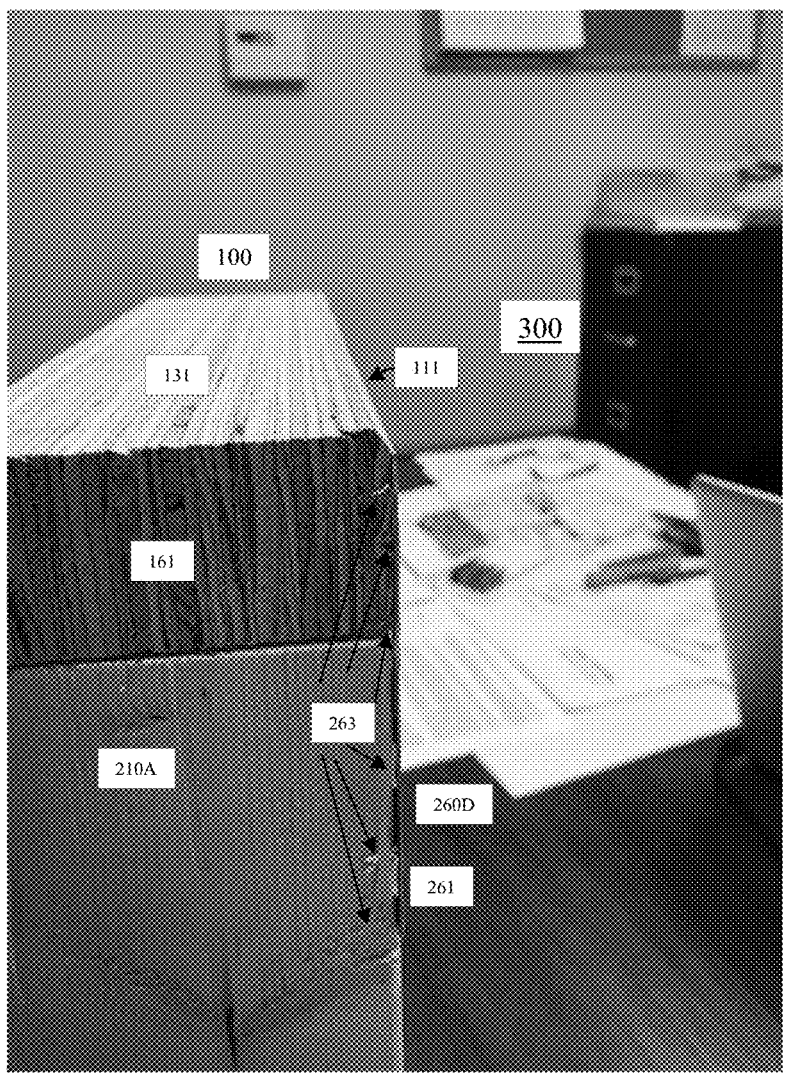
FIG. 3D is a photograph of a second perspective view of an LVL structure including two LVL beam horizontal members in accordance with one embodiment.

FIG. 3D is a photograph of a second perspective view of one example of an LVL structure 300 including two LVL beams of FIG. 3B in accordance with one embodiment. Shown in FIG. 3D are first LVL beam 100 horizontal member, LVL beam first surface 111, LVL beam third surface 131, LVL beam sixth surface 161, vertical member 210A, and fastening plate 260D including frame plate 261 and penetrating members 263 shown penetrating LVL beam first surface 111 perpendicularly to LVL beam first surface 111. As noted above, this is a highly advantageous feature of the disclosed embodiments, since, according to the teachings herein, if the penetrating members 263 penetrate more than one layer of veneer the penetrating members 263 tend to secure the penetrated layers of the veneer making up the LVL beam 100 together in a nail like fashion.

Figure 3E:
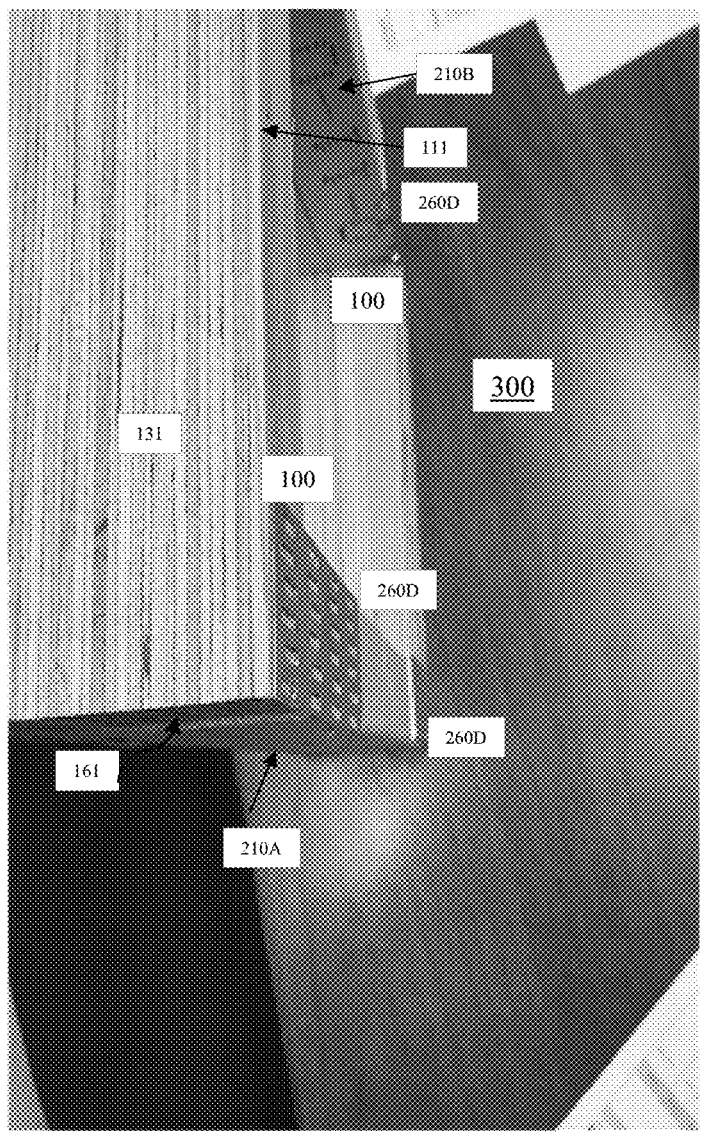
FIG. 3E is a photograph of a third perspective view of an LVL structure including two LVL beam horizontal members in accordance with one embodiment.

FIG. 3E is a photograph of a third perspective view of one example of an LVL structure 300 including two LVL beams of FIG. 3B in accordance with one embodiment. Shown in FIG. 3E are first and second LVL beam 100 horizontal members, LVL beam first surface 111, LVL beam third surface 131, LVL beam sixth surface 161, vertical member 210A, vertical member 210B, and fastening devices 260D.

Figure 3F:
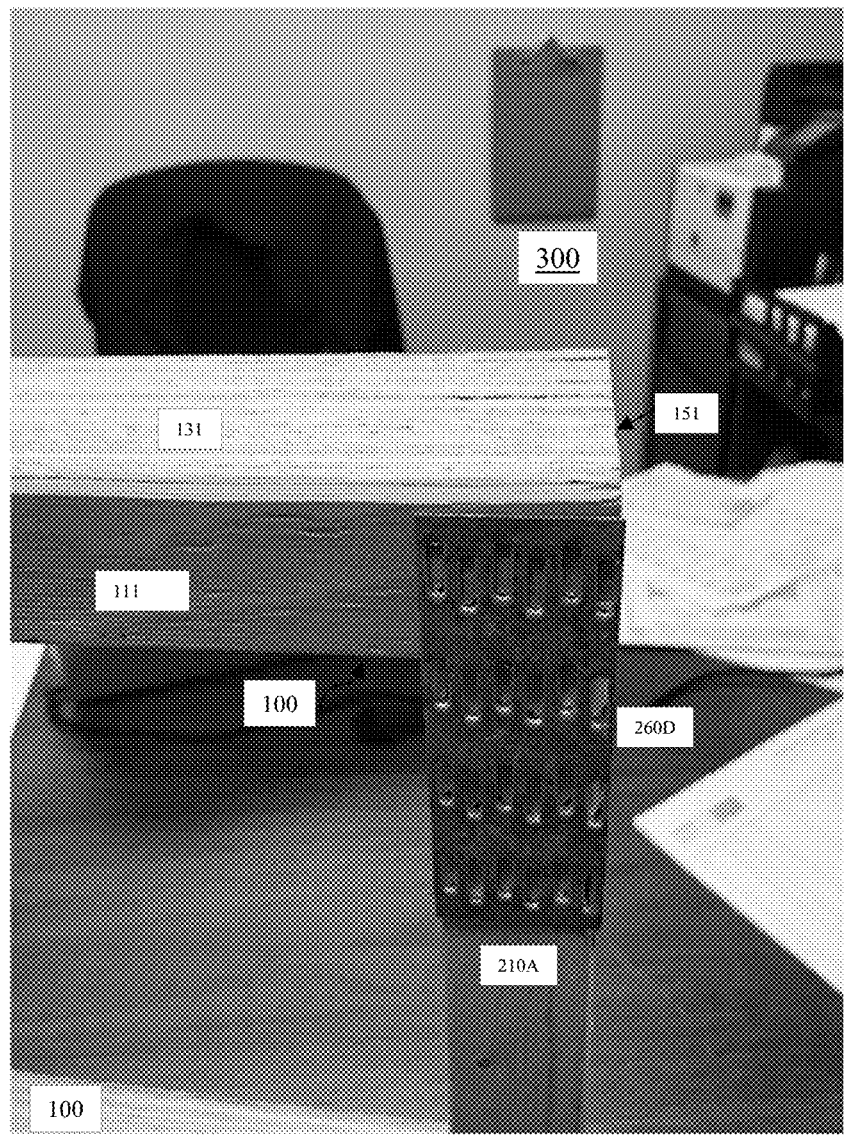
FIG. 3F is a photograph of a fourth perspective view of an LVL structure including two LVL beam horizontal members in accordance with one embodiment.

FIG. 3F is a photograph of a fourth perspective view of one example of an LVL structure 300 including two LVL beams of FIG. 3B in accordance with one embodiment. Shown in FIG. 3F are first and second LVL beam 100 horizontal members, LVL beam first surface 111, LVL beam third surface 131, LVL beam fifth surface 151, vertical member 210A, and fastening plate 260D.

As discussed above with respect to FIGS. 2D and 3B, in various embodiments, an LVL structure includes a first vertical member and a second vertical member.

In various embodiments, the LVL structure includes a first horizontal member, the first horizontal being a first LVL beam, the first LVL beam including an LVL beam first surface that is formed of a single first outer layer of veneer; an LVL beam second surface, opposite the first LVL beam surface, that is formed of a single second outer layer of veneer; and one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers.

In various embodiments, an LVL structure includes a first fastening device having two or more penetrating members, at least one of the penetrating members of the first fastening device penetrating a first portion of the first LVL beam first surface substantially perpendicular to the first LVL beam first surface and, at least one of the penetrating members of the first fastening device penetrating a first surface of the first vertical member so that the first LVL beam is attached to a first end of the first vertical member and that a longitudinal axis of the first LVL beam is substantially perpendicular to a longitudinal axis of the first vertical member.

In various embodiments, an LVL structure includes a second fastening device having two or more penetrating members, at least one of the penetrating members of the second fastening device penetrating a second portion of the first LVL beam first surface substantially perpendicular to the first LVL beam first surface and at least one of the penetrating members of the second fastening device penetrating a first surface the second vertical member so that the first LVL beam is attached to a first end of the second vertical member and that a longitudinal axis of the first LVL beam is substantially perpendicular to a longitudinal axis of the second vertical member.

In various embodiments, an LVL structure includes a second horizontal member, the second horizontal member being attached to a second end of the first vertical member that is opposite the first end of the and first vertical member, the second horizontal member being attached to a second end of the second vertical member that is opposite the first end of the second vertical member such that a longitudinal axis of the second horizontal member is substantially perpendicular to a longitudinal axis of the first vertical member and the second vertical member and that the longitudinal axis of the second horizontal member is substantially parallel to the longitudinal axis of the first horizontal member.

In various embodiments, an LVL structure includes a second horizontal member that is an LVL beam having a first surface that is formed of a single first outer layer of veneer; an LVL beam second surface, opposite the first LVL beam surface, that is formed of a single second outer layer of veneer; and one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers.

In various embodiments, an LVL structure includes a third fastening device having two or more penetrating members, at least one of the penetrating members of the third fastening device penetrating a first portion of the second LVL beam first surface substantially perpendicular to the second LVL beam first surface and at least one of the penetrating members of the third fastening device penetrating a first surface of the first vertical member so that the second LVL beam is attached to a second end of the first vertical member that is opposite the first end of the and first vertical member and that a longitudinal axis of the second LVL beam is substantially perpendicular to a longitudinal axis of the first vertical member.

In various embodiments, an LVL structure includes a fourth fastening device having two or more penetrating members, at least one of the penetrating members of the fourth fastening device penetrating a second portion of the second LVL beam first surface substantially perpendicular to the second LVL beam first surface and at least one of the penetrating members of the fourth fastening device penetrating a first surface the second vertical member so that the second LVL beam is attached to a second end of the second vertical member that is opposite the first end of the and second vertical member and that a longitudinal axis of the second LVL beam is substantially perpendicular to a longitudinal axis of the second vertical member and that the longitudinal axis of the second LVL beam is substantially parallel to a longitudinal axis of the first LVL beam.

Figure 4A:
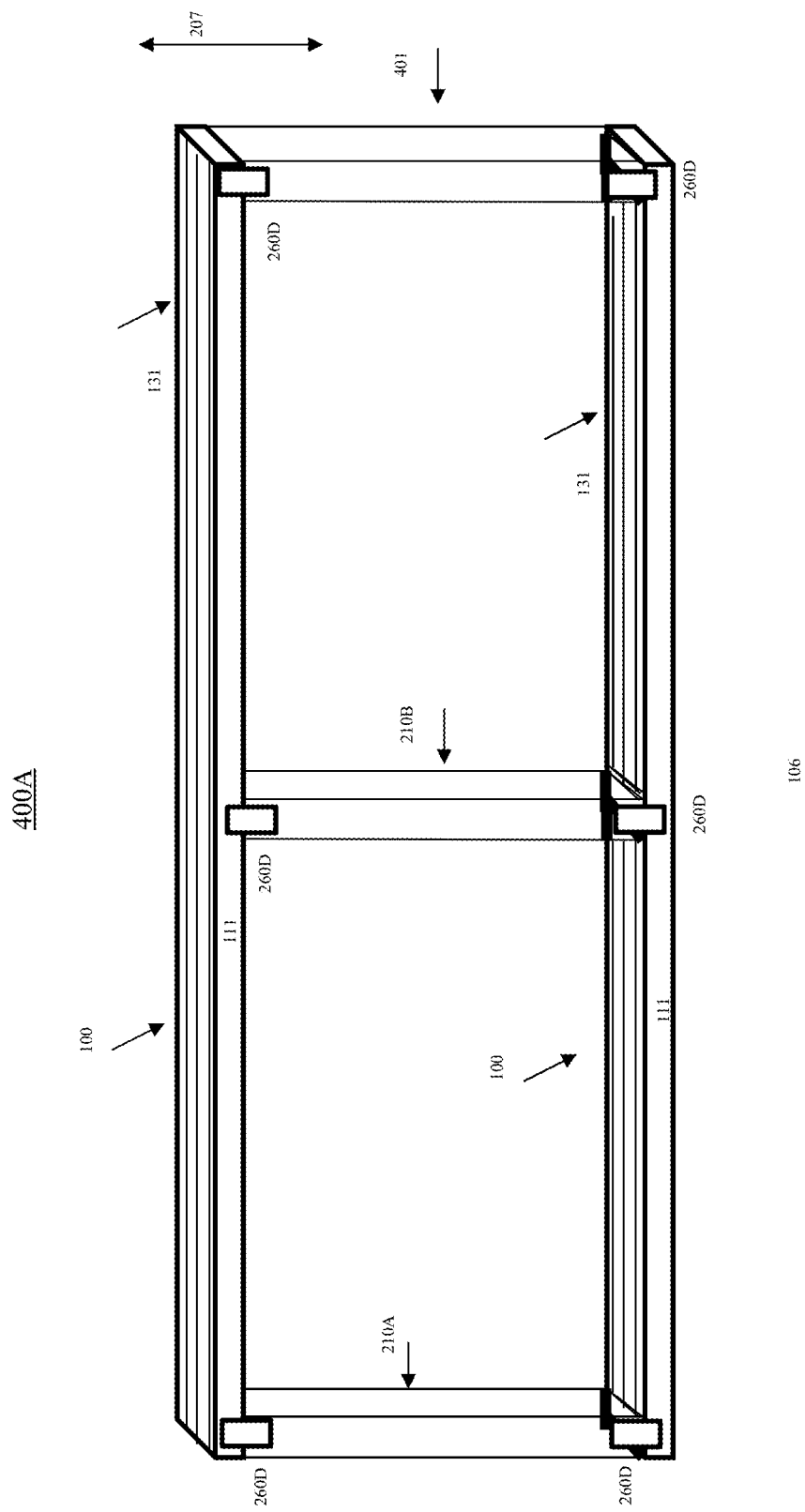
FIG. 4A is a perspective view of an LVL structure including two LVL beam horizontal members and three vertical members after attaching fastening plates in accordance with one embodiment.

In some embodiments, the LVL structures disclosed include more than two vertical members. FIG. 4A is a perspective view of an LVL structure 400A including two LVL beam horizontal members 100 and three vertical members 210A, 210B, and 401 after attaching fastening devices 260D in accordance with one embodiment. The added support of the additional vertical members of LVL structure 400A make LVL structure 400A suitable for longer and/or sturdier applications of the disclosed LVL structures, such as LVL floor truss structures As described above, the resulting LVL structures 200, 300 and 400A are a rectangular cell structures suitable for weight bearing uses such as floor trusses, wall supports, etc. The disclosed LVL structures 200, 300 and 400A use LVL beams 100 constructed with veneer layers and include orientating the LVL beams 100 and fastening devices 260D having penetrating members 263 such that some of the penetrating members 263 penetrate the LVL beams first surfaces 111 substantially perpendicular to the LVL beams 100 first surfaces 111. Consequently, the penetrating members 263 penetrate the LVL beams 100 first surfaces 111 substantially perpendicular to the stacked single first outer layer of veneer 110, one of more inner layers of veneer 112, 114, 116, and 118, and the single second outer layer of veneer 120 making up the LVL beams 100. In this way, the penetrating members 263 will not separate or split the layers of veneer 110, 112, 114, 116, 118, and 120 making up the LVL beams 100. Indeed, according to the teachings of the invention, if the penetrating members 263 penetrate more than one layer of veneer, the penetrating members tend to secure the penetrated layers of the veneer making up the LVL beams 100 together in a nail like fashion. (See FIGS. 3C and 3D).

In one embodiment, the disclosed LVL structure is an LVL floor truss structure. In one embodiment, an LVL floor truss structure includes at least two horizontal members, at least two vertical members attached substantially perpendicularly to the at least two horizontal members, and at least one diagonal member attached at an angle with respect to a longitudinal axis of the first horizontal member and at an angle with respect to a longitudinal axis of the second horizontal member. In one embodiment, the at least two horizontal members, at least two vertical members, and the at least one diagonal member are attached using fastening plates having fastening/penetrating members. In one embodiment, at least one of the horizontal members of the LVL floor truss structure is an LVL beam.

In one embodiment, the LVL floor truss structure includes a first vertical member and a second vertical member.

In one embodiment, the LVL floor truss structure includes a first horizontal member, the first horizontal being a first LVL beam.

In one embodiment, the first LVL beam includes an LVL beam first surface that is formed of a single first outer layer of veneer; an LVL beam second surface, opposite the first LVL beam surface, that is formed of a single second outer layer of veneer; and one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers.

In one embodiment, the LVL floor truss structure includes a first fastening device having two or more penetrating members, at least one of the penetrating members of the first fastening device penetrating a first portion of the first LVL beam first surface substantially perpendicular to the first LVL beam first surface and, at least one of the penetrating members of the first fastening device penetrating a first surface of the first vertical member so that the first LVL beam is attached to a first end of the first vertical member and that a longitudinal axis of the first LVL beam is substantially perpendicular to a longitudinal axis of the first vertical member.

In one embodiment, the LVL floor truss structure includes a second fastening device having two or more penetrating members, at least one of the penetrating members of the second fastening device penetrating a second portion of the first LVL beam first surface substantially perpendicular to the first LVL beam first surface and at least one of the penetrating members of the second fastening device penetrating a first surface the second vertical member so that the first LVL beam is attached to a first end of the second vertical member such that a longitudinal axis of the first LVL beam is substantially perpendicular to a longitudinal axis of the second vertical member.

In one embodiment, the LVL floor truss structure includes a second horizontal member, the second horizontal member being attached to a second end of the first vertical member that is opposite the first end of the and first vertical member, the second horizontal member being attached to a second end of the second vertical member that is opposite the first end of the second vertical member such that a longitudinal axis of the second horizontal member is substantially perpendicular to a longitudinal axis of the first vertical member and the second vertical member and that the longitudinal axis of the second horizontal member is substantially parallel to the longitudinal axis of the first horizontal member.

In one embodiment, the LVL floor truss structure the second horizontal member is a second LVL beam, the second LVL beam including an LVL beam first surface that is formed of a single first outer layer of veneer; an LVL beam second surface, opposite the first LVL beam surface, that is formed of a single second outer layer of veneer; and one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers.

In one embodiment, the LVL floor truss structure includes a third fastening device having two or more penetrating members, at least one of the penetrating members of the third fastening device penetrating a first portion of the second LVL beam first surface substantially perpendicular to the second LVL beam first surface and at least one of the penetrating members of the third fastening device penetrating a first surface of the first vertical member so that the second LVL beam is attached to a second end of the first vertical member that is opposite the first end of the and first vertical member and that a longitudinal axis of the second LVL beam is substantially perpendicular to a longitudinal axis of the first vertical member;

In one embodiment, the LVL floor truss structure includes a fourth fastening device having two or more penetrating members, at least one of the penetrating members of the fourth fastening device penetrating a second portion of the second LVL beam first surface substantially perpendicular to the second LVL beam first surface and at least one of the penetrating members of the fourth fastening device penetrating a first surface the second vertical member so that the second LVL beam is attached to a second end of the second vertical member that is opposite the first end of the and second vertical member and that a longitudinal axis of the second LVL beam is substantially perpendicular to a longitudinal axis of the second vertical member and that the longitudinal axis of the second LVL beam is substantially parallel to a longitudinal axis of the first LVL beam.

In one embodiment, the LVL floor truss structure includes at least one diagonal member being attached to the LVL beam member and the first or second end of the first vertical member such that a longitudinal axis of the at least one diagonal member is at an angle with respect to the longitudinal axis of the LVL beam member, the at least one diagonal member also being attached to the second horizontal member and the second or first end of the second vertical member such that the longitudinal axis of the at least one diagonal member is at an angle with respect to the longitudinal axis of the second horizontal member and extends diagonally from a first corner formed by the junction of LVL beam member and the first or second end of the first vertical member and a second corner formed by the junction of the second horizontal member and the second or first end of the second vertical member.

Figure 4B:
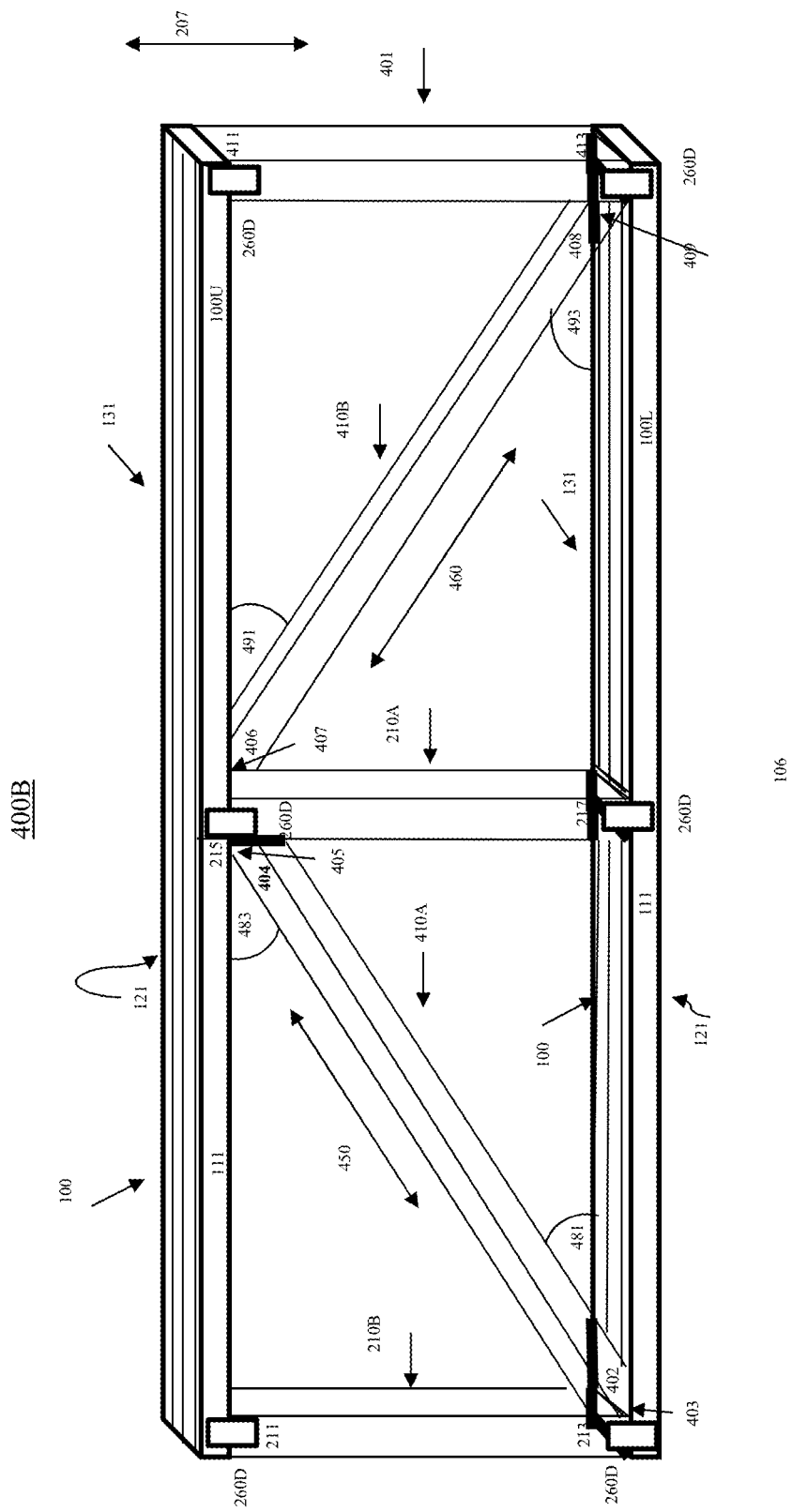
FIG. 4B is a perspective view of an LVL floor truss structure including two LVL beam horizontal members, three vertical members, and two diagonal members after attaching fastening plates in accordance with one embodiment.

FIG. 4B is a perspective view of an LVL floor truss structure 400B including two LVL beam 100 horizontal members 100U and 100L, three vertical members 210A, 210B, 401, and diagonal members 410A and 410B after attaching fastening devices 260D in accordance with one embodiment. In one embodiment, LVL floor truss structure 400B is substantially similar to LVL structures 200, 300 and 400A discussed above with respect to FIGS. 2A, 2B, 2C, 2D, 3A, 3B, 3C, 3D, 3E, 3F, and 4A, and the LVL beam 100 horizontal members 100U and 100L of LVL floor truss structure 400B are substantially similar to the LVL beam 100 horizontal members discussed above with respect to FIGS. 1A, 1B, 1C, 1D, and 1E. Therefore, the LVL beam 100 horizontal members 100U and 100L of LVL floor truss structure 400B have LVL beam first surfaces 111 that, as discussed above, are formed of a single first outer layer of veneer and an LVL beam second surfaces 121, opposite the LVL beam first surfaces 111, that are formed of a single second outer layer of veneer. As discussed above, in one embodiment, the LVL beams 100 include one or more inner layers of veneer positioned in the LVL beam between the single first outer layer of veneer and the single second outer layer of veneer such that each of the single first outer layer of veneer, the one or more inner layers of veneer, and the single second outer layer of veneer making up the LVL beams 100 are stacked in layers one atop the other.

As discussed above, in one embodiment, the LVL beam 100 horizontal member 100U is attached to first ends 211, 215 and 411 of the vertical members 210A, 210B, and 401 and the LVL beam 100 horizontal member 100L is attached to second ends 213, 217, and 413 of the vertical members 210A, 210B, and 401 using at least six fastening devices 260D with penetrating members such that a longitudinal axis 106 of the LVL beam 100 horizontal members 100U and 100L are substantially perpendicular to a longitudinal axis 207 of the vertical members 210A, 210B, and 401.

In one embodiment, the fastening devices 260D have penetrating members and one or more of the penetrating members penetrate the LVL beam 100 horizontal members 100U and 100L first surfaces 111 substantially perpendicular to the LVL beam 100 horizontal members 100U and 100L first surfaces 111. Consequently, in one embodiment, one or more penetrating members penetrate the LVL beam 100 horizontal members 100U and 100L first surfaces 111 substantially perpendicular to the stacked single first outer layer of veneer, one or more inner layers of veneer, and the single second outer layer of veneer making up the LVL beam 100 horizontal members 100U and 100L. In this way, the penetrating members will not separate or split the layers of veneer making up the LVL beam 100 horizontal members 100U and 100L. Indeed, according to the teachings of the invention, if the penetrating members penetrate more than one layer of veneer, the penetrating members tend to secure the penetrated layers of the veneer making up the LVL beam 100 horizontal members 100U and 100L together in a nail like fashion. (See FIGS. 3C and 3D)

As seen in FIG. 4B, in one embodiment, LVL floor truss structure 400B includes two diagonal members 410A and 410B. In one embodiment, a first end 402 of diagonal member 410A is attached to a first corner 403 where vertical member 210B and LVL beam 100 horizontal member 100L meet. In one embodiment, a second end 404 of diagonal member 410A is attached to a second corner 405 where vertical member 210B and LVL beam 100 horizontal member 100U meet. Consequently, in this embodiment, diagonal member 410A is attached to first corner 403 and second corner 405 such that a longitudinal axis 450 of diagonal member 410A is at an angle 481 with respect to a longitudinal axis 106 of the LVL beam 100 horizontal member 100L and at an angle 483 with respect to a longitudinal axis 106 of the LVL beam 100 horizontal member 100U In one embodiment, a first end 406 of diagonal member 410B is attached to a third corner 407 where vertical member 210B and LVL beam 100 horizontal member 100U meet. In one embodiment, a second end 408 of diagonal member 410B is attached to a fourth corner 409 where vertical member 401 and LVL beam 100 horizontal member 100L meet. Consequently, in this embodiment, diagonal member 410B is attached to third corner 407 and fourth corner 409 such that a longitudinal axis 460 of diagonal member 410B is at an angle 491 with respect to a longitudinal axis 106 of the LVL beam 100 horizontal member 100U and at an angle 493 with respect to a longitudinal axis 106 of the LVL beam 100 horizontal member 100L.

In one embodiment, diagonal members 401A and 410B can be LVL beams 100 and therefore are LVL beam 100 diagonal members 401A and 410B. In this embodiment, fastening devices 260D with penetrating members 263 are used to attach the LVL beam 100 diagonal members 401A and 410B to the LVL beam 100 horizontal members 100U and 100L and/or vertical members 210A, 210B and 401. In one embodiment, the one or more of the penetrating members penetrate the LVL beam 100 diagonal members 401A and 410B first surfaces substantially perpendicular to the LVL beam 100 diagonal members 401A and 410B first surfaces. Consequently, in one embodiment, one or more penetrating members penetrate the LVL beam 100 diagonal members 401A and 410B first surfaces substantially perpendicular to the stacked single first outer layer of veneer, one of more inner layers of veneer, and the single second outer layer of veneer making up the LVL beam diagonal member. In this way, the penetrating members will not separate or split the layers of veneer making up the LVL beam 100 diagonal members 401A and 410B. Indeed, according to the teachings of the invention, if the penetrating members penetrate more than one layer of veneer, the penetrating members tend to secure the penetrated layers of the veneer making up the LVL beam 100 diagonal members 401A and 410B together in a nail like fashion. (See FIGS. 3C and 3D)

While LVL structures 400A and 400B in FIGS. 4A and 4B include only three vertical members, and include only two diagonal members in LVL floor truss structure 400B of FIG. 4B, it is to be understood this choice is but one example and is made for illustrative purposes only. In practice, structures 400A and 400B can be relatively long structures running the entire length of a large building and can therefore include any number of vertical members and diagonal members desired to provide the needed strength and dimensions. This is possible because, as noted above, the use of veneer, and particularly veneer that has uniform qualities such as consistent surface texture and moisture content, allows layered wood products, such as LVL beams 100, of various lengths, thickness and dimensions to be created without milling a board of the desired thickness or dimension from a single log or single piece of lumber. This, in turn, allows for much more efficient use of natural resources. In addition, since LVL beams 100, according to the disclosed embodiments, are fabricated in a factory under controlled specifications, LVL beams 100 can be manufactured to virtually any dimensions desired, including dimensions such as length, width, and height well beyond dimensions that can be provided by milling from even the largest trees.

Consequently, the LVL structures 400A and 400B in FIGS. 4A and 4B including three vertical members, and two diagonal members, are merely representative examples of specific embodiments and therefore do not limit the scope of the claims below or the uses of the disclosed embodiments envisioned by the inventors.

As described above, the resulting LVL floor truss structure 400B is a rectangular cell and support structure suitable for weight bearing uses. The disclosed LVL floor truss structure 400B uses one or more LVL beams and fastening plates or devices having penetrating members such that the penetrating members penetrate the one or more LVL beams first surface substantially perpendicular to the one or more LVL beams first surface. In this way, the penetrating members will not separate or split the layers of veneer making up the one or more LVL beams. Indeed, according to the teachings of the invention, if the penetrating members penetrate more than one layer of veneer, the penetrating members tend to secure the penetrated layers of the veneer making up the one or more LVL beams together in a nail like fashion. (See FIGS. 3C and 3C).

In one embodiment, the various members of LVL floor truss structure 400B can be cut to a traditional 2×4 size having actual dimensions of approximately 1.5 inches by 3.5 inches. Consequently, the resulting LVL floor truss structure 400B in some embodiments is constructed of industry standard dimensioned members and therefore can be readily incorporated with existing plans and structures.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. An LVL structure comprising:
   a first vertical member;
   a second vertical member;
   a first horizontal member, the first horizontal being a first LVL beam, the first LVL beam including:
   an LVL beam first surface that is formed of a single first outer layer of veneer;
   an LVL beam second surface, opposite the first LVL beam surface, that is formed of a single second outer layer of veneer; and
   one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers;
   a first fastening device having two or more penetrating members, at least one of the penetrating members of the first fastening device penetrating a first portion of the first LVL beam first surface substantially perpendicular to the first LVL beam first surface and, at least one of the penetrating members of the first fastening device penetrating a first surface of the first vertical member so that the first LVL beam is attached to a first end of the first vertical member and that a longitudinal axis of the first LVL beam is substantially perpendicular to a longitudinal axis of the first vertical member;
   a second fastening device having two or more penetrating members, at least one of the penetrating members of the second fastening device penetrating a second portion of the first LVL beam first surface substantially perpendicular to the first LVL beam first surface and at least one of the penetrating members of the second fastening device penetrating a first surface of the second vertical member so that the first LVL beam is attached to a first end of the second vertical member and that a longitudinal axis of the first LVL beam is substantially perpendicular to a longitudinal axis of the second vertical member; and
   a second horizontal member, the second horizontal member being attached to a second end of the first vertical member that is opposite the first end of the first vertical member, the second horizontal member being attached to a second end of the second vertical member that is opposite the first end of the second vertical member such that a longitudinal axis of the second horizontal member is substantially perpendicular to a longitudinal axis of the first vertical member and the second vertical member and that the longitudinal axis of the second horizontal member is substantially parallel to the longitudinal axis of the first horizontal member.

2. The LVL structure of claim 1 wherein the first vertical member, the second vertical member, the first LVL beam member, and the second horizontal member are cut to a traditional 2×4 size having actual dimensions of approximately 1.5 inches by 3.5 inches, further wherein, a height of the first LVL beam member first surface is approximately 1.5 inches and the single first outer layer of veneer, the one of more inner layers of veneer, and the single second outer layer of veneer making up the first LVL beam are arranged in layers to a width of approximately 3.5 inches.

3. The LVL structure of claim 1 wherein the first and second fastening devices are
plates including integrally formed penetrating devices.

4. The LVL structure of claim 1 wherein the second horizontal member is a second LVL beam, the second LVL beam including:
an LVL beam first surface that is formed of a single first outer layer of veneer;
an LVL beam second surface, opposite the first LVL beam surface, that is formed of a single second outer layer of veneer; and
one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers.

5. The LVL structure of claim 4 further comprising:
a third fastening device having two or more penetrating members, at least one of the penetrating members of the third fastening device penetrating a first portion of the second LVL beam first surface substantially perpendicular to the second LVL beam first surface and at least one of the penetrating members of the third fastening device penetrating a first surface of the first vertical member so that the second LVL beam is attached to a second end of the first vertical member that is opposite the first end of the first vertical member and that a longitudinal axis of the second LVL beam is substantially perpendicular to a longitudinal axis of the first vertical member;
a fourth fastening device having two or more penetrating members, at least one of the penetrating members of the fourth fastening device penetrating a second portion of the second LVL beam first surface substantially perpendicular to the second LVL beam first surface and at least one of the penetrating members of the fourth fastening device penetrating a first surface of the second vertical member so that the second LVL beam is attached to a second end of the second vertical member that is opposite the first end of the second vertical member and that a longitudinal axis of the second LVL beam is substantially perpendicular to a longitudinal axis of the second vertical member and that the longitudinal axis of the second LVL beam is substantially parallel to a longitudinal axis of the first LVL beam.

6. The LVL structure of claim 5 wherein the first vertical member, the second vertical member, the first LVL beam member, and the second LVL beam member are cut to a traditional 2×4 size having actual dimensions of approximately 1.5 inches by 3.5 inches, further wherein, a height of the first LVL beam member first surface and a height of the second LVL beam member first surface is approximately 1.5 inches and the single first outer layer of veneer, the one of more inner layers of veneer, and the single second outer layer of veneer making up the first LVL beam member and second LVL beam member are arranged in layers to a width of approximately 3.5 inches.

7. The LVL structure of claim 5 wherein the first, second, third, and fourth fastening devices are
plates including integrally formed penetrating devices.

8. An LVL floor truss structure comprising:
a first vertical member;
a second vertical member;
a first horizontal member, the first horizontal being a first LVL beam, the first LVL beam including:
an LVL beam first surface that is formed of a single first outer layer of veneer;
an LVL beam second surface, opposite the first LVL beam surface, that is formed of a single second outer layer of veneer; and
one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers;
a first fastening device having two or more penetrating members, at least one of the penetrating members of the first fastening device penetrating a first portion of the first LVL beam first surface substantially perpendicular to the first LVL beam first surface and, at least one of the penetrating members of the first fastening device penetrating a first surface of the first vertical member so that the first LVL beam is attached to a first end of the first vertical member and that a longitudinal axis of the first LVL beam is substantially perpendicular to a longitudinal axis of the first vertical member;
a second fastening device having two or more penetrating members, at least one of the penetrating members of the second fastening device penetrating a second portion of the first LVL beam first surface substantially perpendicular to the first LVL beam first surface and at least one of the penetrating members of the second fastening device penetrating a first surface of the second vertical member so that the first LVL beam is attached to a first end of the second vertical member such that a longitudinal axis of the first LVL beam is substantially perpendicular to a longitudinal axis of the second vertical member;
a second horizontal member, the second horizontal member being attached to a second end of the first vertical member that is opposite the first end of the first vertical member, the second horizontal member being attached to a second end of the second vertical member that is opposite the first end of the second vertical member such that a longitudinal axis of the second horizontal member is substantially perpendicular to a longitudinal axis of the first vertical member and the second vertical member and that the longitudinal axis of the second horizontal member is substantially parallel to the longitudinal axis of the first horizontal member; and
at least one diagonal member being attached to the LVL beam member and the first or second end of the first vertical member such that a longitudinal axis of the at least one diagonal member is at an angle with respect to the longitudinal axis of the LVL beam member, the at least one diagonal member also being attached to the second horizontal member and the second or first end of the second vertical member such that the longitudinal axis of the at least one diagonal member is at an angle with respect to the longitudinal axis of the second horizontal member and extends diagonally from a first corner formed by the junction of LVL beam member and the first or second end of the first vertical member and a second corner formed by the junction of the second horizontal member and the second or first end of the second vertical member.

9. The LVL floor truss structure of claim 8 wherein the first vertical member, the second vertical member, the first LVL beam member, the second horizontal member, and the at least one diagonal member are cut to a traditional 2×4 size having actual dimensions of approximately 1.5 inches by 3.5 inches, further wherein, a height of the first LVL beam member first surface is approximately 1.5 inches and the single first outer layer of veneer, the one or more inner layers of veneer, and the single second outer layer of veneer making up the first LVL beam are arranged in layers to a width of approximately 3.5 inches.

10. The LVL floor truss structure of claim 8 wherein the first and second fastening devices are
plates including integrally formed penetrating devices.

11. The LVL floor truss structure of claim 8 wherein the second horizontal member is a second LVL beam, the second LVL beam including:
an LVL beam first surface that is formed of a single first outer layer of veneer;
an LVL beam second surface, opposite the first LVL beam surface, that is formed of a single second outer layer of veneer; and
one or more inner layers of LVL veneer positioned in the LVL beam between the single first outer layer of veneer and the single second outer layer of veneer such that the single first outer layer of veneer, the one or more inner layers of veneer, and the single second outer layer of veneer making up the LVL beam are arranged in layers.

12. The LVL floor truss structure of claim 11 further comprising:
a third fastening device having two or more penetrating members, at least one of the penetrating members of the third fastening device penetrating a first portion of the second LVL beam first surface substantially perpendicular to the second LVL beam first surface and at least one of the penetrating members of the third fastening device penetrating a first surface of the first vertical member so that the second LVL beam is attached to a second end of the first vertical member that is opposite the first end of the first vertical member and that a longitudinal axis of the second LVL beam is substantially perpendicular to a longitudinal axis of the first vertical member;
a fourth fastening device having two or more penetrating members, at least one of the penetrating members of the fourth fastening device penetrating a second portion of the second LVL beam first surface substantially perpendicular to the second LVL beam first surface and at least one of the penetrating members of the fourth fastening device penetrating a first surface of the second vertical member so that the second LVL beam is attached to a second end of the second vertical member that is opposite the first end of the second vertical member and that a longitudinal axis of the second LVL beam is substantially perpendicular to a longitudinal axis of the second vertical member and that the longitudinal axis of the second LVL beam is substantially parallel to a longitudinal axis of the fist LVL beam.

13. The LVL floor truss structure of claim 12 wherein the first vertical member, the second vertical member, the first LVL beam member, and the second LVL beam member, and the at least one diagonal member are cut to a traditional 2×4 size having actual dimensions of approximately 1.5 inches by 3.5 inches, further wherein, a height of the first LVL beam member first surface and a height of the second LVL beam member first surface is approximately 1.5 inches and the single first outer layer of veneer, the one of more inner layers of veneer, and the single second outer layer of veneer making up the first LVL beam member and second LVL beam member are arranged in layers to a width of approximately 3.5 inches.

14. The LVL floor truss structure of claim 12 wherein the first, second, third, and fourth fastening devices are
plates including integrally formed penetrating devices.

15. A method for constructing an LVL floor truss, the method comprising:
providing a first vertical member;
providing a second vertical member;
providing a first horizontal member, the first horizontal being a first LVL beam, the first LVL beam including:
an LVL beam first surface that is formed of a single first outer layer of veneer;
an LVL beam second surface, opposite the first LVL beam surface, that is formed of a single second outer layer of veneer; and
one or more inner layers of LVL veneer positioned in the LVL beam between the single first outer layer of veneer and the single second outer layer of veneer such that the single first outer layer of veneer, the one of more inner layers of veneer, and the single second outer layer of veneer making up the LVL beam are arranged in layers;
attaching, using a first fastening device, the first LVL beam to a first end of the first vertical member, the first fastening device having two or more penetrating members, at least one of the penetrating members of the first fastening device penetrating a first portion of the first LVL beam first surface substantially perpendicular to the first LVL beam first surface and, at least one of the penetrating members of the first fastening device penetrating a first surface of the first vertical member so that the first LVL beam is attached to a first end of the first vertical member and that a longitudinal axis of the first LVL beam is substantially perpendicular to a longitudinal axis of the first vertical member;
attaching, using a second fastening device, the first LVL beam to a first end of the second vertical member, the second fastening device having two or more penetrating members, at least one of the penetrating members of the second fastening device penetrating a second portion of the first LVL beam first surface substantially perpendicular to the first LVL beam first surface and at least one of the penetrating members of the second fastening device penetrating a first surface of the second vertical member so that the first LVL beam is attached to a first end of the second vertical member and that a longitudinal axis of the first LVL beam is substantially perpendicular to a longitudinal axis of the second vertical member;
providing a second horizontal member,
attaching the second horizontal member to a second end of the first vertical member that is opposite the first end of the first vertical member, attaching the second horizontal member to a second end of the second vertical member that is opposite the first end of the second vertical member such that a longitudinal axis of the second horizontal member is substantially perpendicular to a longitudinal axis of the first vertical member and the first vertical member and the longitudinal axis of the second horizontal member is substantially parallel to the longitudinal axis of the first horizontal member;

providing at least one diagonal member, attaching the at least one diagonal member to the LVL beam member and the first or second end of the first vertical member such that a longitudinal axis of the at least one diagonal member is at an angle with respect to the longitudinal axis of the LVL beam member, the at least one diagonal member also being attached to the second horizontal member and the second or first end of the second vertical member such that the longitudinal axis of the at least one diagonal member is at an angle with respect to the longitudinal axis of the second horizontal member and extends diagonally from a first corner formed by the junction of LVL beam member and the first or second end of the first vertical member and a second corner formed by the junction of the second horizontal member and the second or first end of the second vertical member.

16. The method for constructing an LVL floor truss of claim 15 wherein the first vertical member, the second vertical member, the first LVL beam member, the second horizontal member, and the at least one diagonal member are cut to a traditional 2×4 size having actual dimensions of approximately 1.5 inches by 3.5 inches, further wherein, a height of the first LVL beam member first surface is approximately 1.5 inches and the single first outer layer of veneer, the one of more inner layers of veneer, and the single second outer layer of veneer making up the first LVL beam are arranged in layers to a width of approximately 3.5 inches.

* * * * *